(12) United States Patent
Heimann et al.

(10) Patent No.: US 10,685,293 B1
(45) Date of Patent: Jun. 16, 2020

(54) METHODS AND SYSTEMS FOR ANALYZING CYBERSECURITY THREATS

(71) Applicant: CYBRAICS, INC., Fort Lauderdale, FL (US)

(72) Inventors: Richard Edwin Heimann, Washington, DC (US); Jonathan Lee Ticknor, Brambleton, VA (US); Amanda Lynn Traud, Arlington, VA (US); Marshall Thomas Vandergrift, Atlanta, GA (US); Kaska Adoteye, Arlington, VA (US); Jesse Pruitt Jeter, Arlington, VA (US); Michael Toru Czerny, Alexandria, VA (US)

(73) Assignee: CYBRAICS, INC., Fort Lauderdale, FL (US)

( * ) Notice: Subject to any disclaimer, the term of this patent is extended or adjusted under 35 U.S.C. 154(b) by 171 days.

(21) Appl. No.: 15/411,460

(22) Filed: Jan. 20, 2017

(51) Int. Cl.
G06N 99/00 (2019.01)
G06N 20/00 (2019.01)
H04L 29/06 (2006.01)

(52) U.S. Cl.
CPC ......... G06N 20/00 (2019.01); H04L 63/1425 (2013.01)

(58) Field of Classification Search
CPC ..................... H04L 63/1425; G06N 99/005
See application file for complete search history.

(56) References Cited

U.S. PATENT DOCUMENTS

| | | | |
|---|---|---|---|
| 2008/0104703 A1* | 5/2008 | Rihn | G06F 21/56 726/24 |
| 2009/0281981 A1* | 11/2009 | Chen | G06K 9/6282 706/56 |
| 2015/0264070 A1* | 9/2015 | Harlacher | H04L 63/1441 726/23 |
| 2017/0132523 A1* | 5/2017 | Zhang | G06N 5/047 |
| 2017/0169360 A1* | 6/2017 | Veeramachaneni | G06F 21/56 |
| 2018/0034840 A1* | 2/2018 | Marquardt | H04L 63/1425 |
| 2018/0113773 A1* | 4/2018 | Krishnan | G06F 11/0706 |
| 2018/0145997 A1* | 5/2018 | Chakraborty | H04L 63/1425 |
| 2018/0167404 A1* | 6/2018 | Machlica | H04L 63/1425 |
| 2018/0174060 A1* | 6/2018 | Velez-Rojas | G06N 5/04 |

* cited by examiner

*Primary Examiner* — Trang T Doan
*Assistant Examiner* — Jessica J South
(74) *Attorney, Agent, or Firm* — DLA Piper LLP (US)

(57) ABSTRACT

To analyze cybersecurity threats, an analysis module of a processor may receive log data from at least one network node. The analysis module may identify at least one statistical outlier within the log data. The analysis module may determine that the at least one statistical outlier represents a cybersecurity threat by applying at least one machine learning algorithm to the at least one statistical outlier.

44 Claims, 31 Drawing Sheets

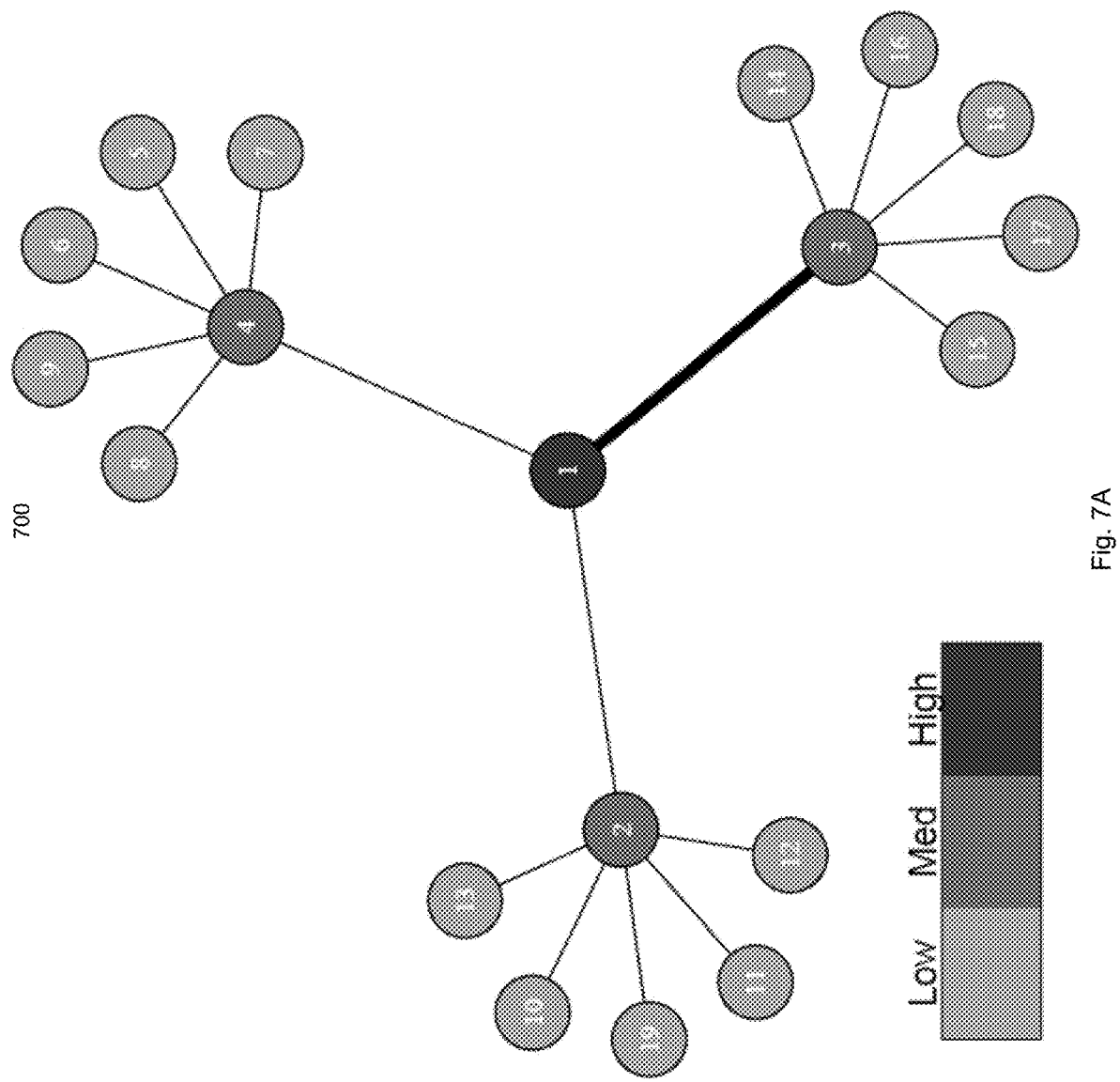

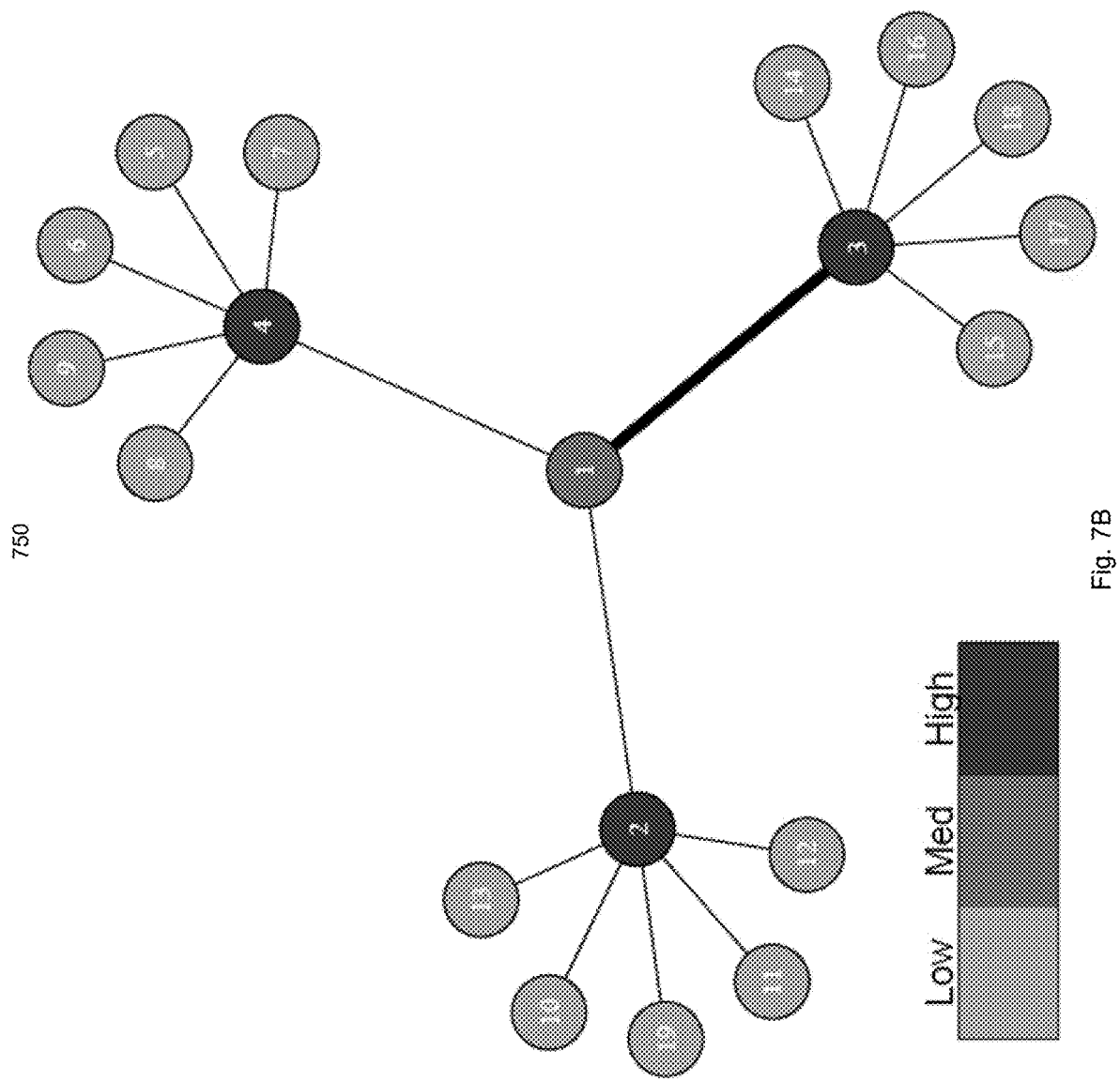

REPLACEMENT DRAWING

|  | IP | Port1 | Port2 | Port3 |
|---|---|---|---|---|
| Port3 | 2 | 0 | 0 | 0 |
| Port2 | 1 | 0 | 0 | 0 |
| Port1 | 1 | 0 | 0 | 0 |
| IP | 0 | 1 | 1 | 2 |

Fig. 10

1300
Word2Vec scans across sentences and uses a context of words to predict a target word.
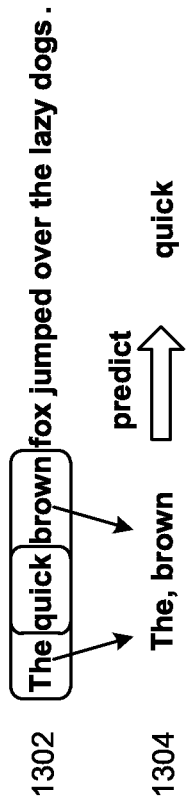
1302
1304    The, brown
predict
quick
Each word in the vocabulary is assigned a vector weight of dimension N. The vector values are updated as Word2Vec trains, and these resulting vectors are the final output. The dimensions of these vectors encode the meaning of the words.
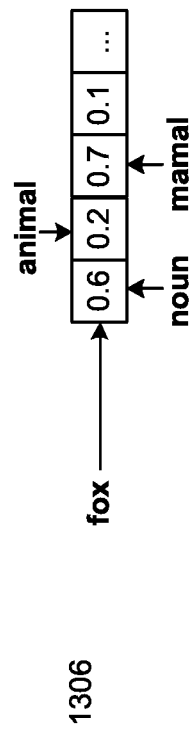
1306    fox
Fig. 13

2200

| Feature Name |
|---|
| Count of unique internal destination IPs as a percentage of Customer internal IP space |
| Count of unique source IPs contacting the outlier as a percentage of customer internal IP space |
| Count of unique external destination IPs |
| Count of unique external source IPs |
| Count of destination ports hit on internal IPs |
| Count of destination ports internal IPs contact the outlier on |
| Count of destination ports contacted on external IPs |
| Count of destination ports external IPs contact the outlier on |
| Percentage of traffic to other IPs on Critical ports (Table 2) |
| Percentage of traffic to the outlier on Critical ports (Table 2) |
| Percentage of traffic from the outlier to web traffic ports |
| Percentage of traffic to the outlier on web traffic ports |
| Count of total bytes sent per hour to external destination IPs |
| Count of total bytes received per hour from external destination IPs |
| Unique port to activity ratio $\left(\frac{ports\ contacted}{total\ flows}\right)$ |
| Unique port to activity ratio where outlier is destination of the traffic |
| Flag for if outlier is internal to customer network |
| Percentage of outlier's traffic to internal customer IPs |
| Percentage of outlier's traffic from internal customer IPs |
| Flag for if outlier talks to external IPs over IE ports (Table 2) |
| Flag for if the outlier is talked to from external IPs over EI ports (Table 2) |
| Flag for if outlier talks to internal IPs over EI ports (Table 2) |
| Flag for if outlier is talked to from internal IPs over IE ports (Table 2) |
| Largest total bytes sent per hour to a single external IP |
| Largest total bytes received per hour from a single external IP |
| Percentage of traffic to most frequently contacted IP |
| Percentage of traffic to most frequently contacted port |
| Byte to packet ratio of traffic coming from outlier |
| Byte to packet ratio of traffic going to outlier |
| Percentage of traffic over TCP |
| Percentage of traffic over UDP |

| |
|---|
| Percentage of traffic over ICMP |
| Bytes transferred per hour over TCP |
| Bytes transferred per hour over UDP |
| Percentage of ICMP traffic with a message other than 0 or 2048 from outlier |
| Percent of traffic that is simply Syn flags when outlier is source and destination Is external |
| Percent of traffic that is simply Syn flags when outlier is destination and source is internal |
| Percentage traffic from most frequently contacting IP |
| Percentage of traffic to outlier on most frequently contacted port |
| Highest number of internal IPs in a subnet (here denoted by a /24) contacted |
| Flag for if outlier is contacting an external IP over common BitTorrent ports (Table 2) |
| Flag for if outlier is contacted by an internal IP over common BitTorrent porta (Table 2) |
| Max periodicity of connection times with empty packets from outlier to a particular host (Periodicity described in Section 1.1.1) |
| Max periodicity of connection times with empty packets from outlier to a all hosts (Periodicity described in Section 1.1.1) |
| Max periodicity of connection times with empty packets to outlier from a particular host (Periodicity described in Section 1.1.1) |
| Max periodicity of connection times with empty packets to outlier from all hosts (Periodicity described in Section 1.1.1) |
| Max periodicity of byte transfers from outlier to a particular host (Periodicity described in Section 1.1.1) |
| Max periodicity of byte transfers from outlier to a all hosts (Periodicity described in Section 1.1.1 |
| Max periodicity of byte transfers to outlier from a particular host (Periodicity described in Section 1.1.1) |
| Max periodicity of byte transfers to outlier from all hosts (Periodicity described in Section 1.1.1 |
| a flag for if the ASA teardowns could never be matched with a built for that IP in the entire period (so for netflow this will always be 1) |

Table 1: This is a list of the features Janus uses for netflow data. Each of these features is populated for each outlier IP. "Destination IPs" are IPs contacted by the outlier, and "source IPs" are IPs contacting the outlier.

| Port | Description | Critical | IE | IE | BitTorrent |
|---|---|---|---|---|---|
| 20-21 | FTP | x | x | x | |
| 22 | SSH | x | x | x | |
| 23 | Telnet | x | | x | |
| 25 | SMTP | x | | | |
| 53 | DNS | | | x | |
| 110 | POP3 | x | | | |
| 111 | SunRPC | x | | x | |
| 136 | NetBIOS possible | x | | x | |
| 137 - 139 | NetBIOS | x | x | x | |
| 143 | IMAP4 | x | | | |
| 389 | LDAP | x | | x | |
| 445 | SMB | x | x | x | |
| 465 | SMTP SSL | x | | | |
| 989 - 900 | FTP SSL | x | x | x | |
| 993 | IMAP4 SSL | x | | | |
| 995 | POP3 SSL | x | | | |
| 1433 - 1434 | SQL Server | x | | x | |
| 2200 | SSH alternate | x | | x | |
| 2483 - 2484 | Oracle DB | x | | x | |
| 3268 | Global Catalog | | | x | |
| 3306 | MySQL | x | | x | |
| 3389 | Terminal Server | x | | x | |
| 3478 | STUN | | x | | |
| 6665 - 6669 | IRC | x | x | x | |
| 6697 | IRC SSL | x | x | x | |
| 6881 - 6890 | BitTorrent | x | | | |
| 10022 | SSH/SFTP alternate | x | | | x |
| 31337 | "Elite" in hacker spelling. Commonly used for exploits | | | x | |

Table 2: This is a list of the ports used in Janus' features and categorization. The port and its decription is given, and an 'x' is put under the column Critical, IE, EI, or BitTorrent if that port is used in the list of Critical , IE, EI, or BitTorrent ports respectively

Fig. 23

| Class Name | Class Description |
|---|---|
| Forward | This is most likely interesting to a customer SOC. These are likely not false positives from the unsupervised core. |
| Do Not Send | This is most likely not interesting to a customer SOC. These are likely false positives from the unsupervised core. |
| Unknown | This is something that Janus believes that the SOC analyst will be unsure of what to do with. |
| Decision Boundary | This is something that Janus itself is unsure of Janus will outputs as on this class, but outputs it anyway. For more information consult Section 3. |

Table 3: These are the possible recommend ations/classes that Janus will outputs as well as the description of each. "Forward", "Do Not Send" and "Unknown" are recommendations/classes that Janus is trained with.

| TimeStamp | IP | Analytic | Class Description |
|---|---|---|---|
| 2016-00-01 00:00:00 | 10.120.150 | EdgeX | Do Not Send, Traversal communication, Traversal protocol |
| 2016-08-28 00:00:00 | 10.20.17.248 | EdgeX | Decision Boundary, IE |
| 2016-09-02 00:00:00 | 10.12.24.112 | EdgeX WeightX | Forward, Traversal communication, Traversal protocol, Swarm P2P, Blacklist |
| 2016-08-22 00:00:00 | 10.20.4.135 | EdgeX | Forward, Lateral communication, Lateral protocol |
| 2016-08-01 00:00:00 | 172.21.115.18 | CommX | Decision Boundary Extrusive communication . Extrusive protocol. Intrusive target |
| 2016-00-06 00:00:00 | 172.22.40.129 | WeightX | Forward, Traversal communication, Traversal protocol, DLP, Swarm P2P, Blacklist |

2500

Table 4: Here is a sample of output from Janus across multiple days . We see that for the labels Janus outputs both a class (Table 3 for details ) and categories (Table 5 for details).

Fig. 25

These are both histograms of $p_1 - p_2$ for Janus LOO cross-validation. On the left is the histogram for predictions that Janus made correctly, and on the is the histogram for predictions that Janus made incorrectly

2800

Caraway DNS query model as directed factor graph.

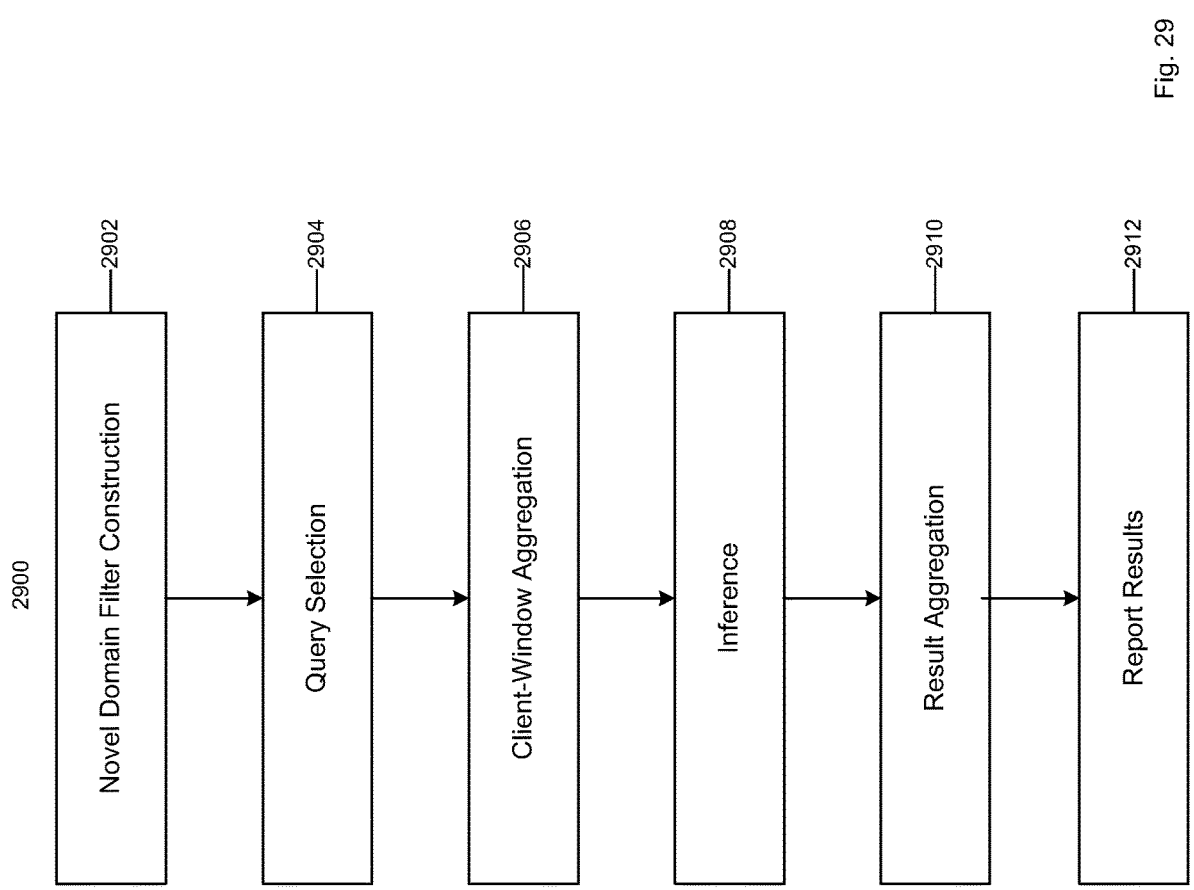

METHODS AND SYSTEMS FOR ANALYZING CYBERSECURITY THREATS

BRIEF DESCRIPTION OF THE DRAWINGS

FIGS. 7A and 7B are example weighted PageRanks according to an embodiment of the invention.

FIG. 10 is an example adjacency matrix for a bipartite graph according to an embodiment of the invention.

FIG. 13 is an example target word prediction according to an embodiment of the invention.

FIGS. 22A-22B show a table of metadata for NetFlow data according to an embodiment of the invention.

FIG. 23 is a port table according to an embodiment of the invention.

FIG. 24 is a behavior table according to an embodiment of the invention.

FIG. 25 is an output table according to an embodiment of the invention.

FIG. 29 is an analysis process according to an embodiment of the invention.

DETAILED DESCRIPTION OF SEVERAL EMBODIMENTS

Systems and methods described herein may provide an artificial intelligence advanced cyber detection platform. Cyber Active Learning Intelligence (CALI) may merge intelligent machines and humans to create a platform that autonomously and actively learns like a human, together with humans in some embodiments. The platform may function as a cyber threat detection system using Artificial Intelligence (AI). The underlying technology may leverage self-training and/or self-learning, two areas of active research within artificial intelligence, and/or unsupervised machine learning, a growing area of research in machine learning, for example supervised and/or unsupervised machine learning. Accordingly, the platform may provide threat analysis that goes beyond rule or signature based analysis, where security applications flag events that match known signatures or actions that violate predefined rules based on past threats. Thus, the platform may avoid the creation of thousands of extraneous alerts per month due to the large number of false positives, where false positives are often an effort to find unknown threats or modifications to known threats that the analysis does not find naturally. The self-training and self-learning may allow the platform to find threats naturally and in an anticipatory fashion.

Figure 1:
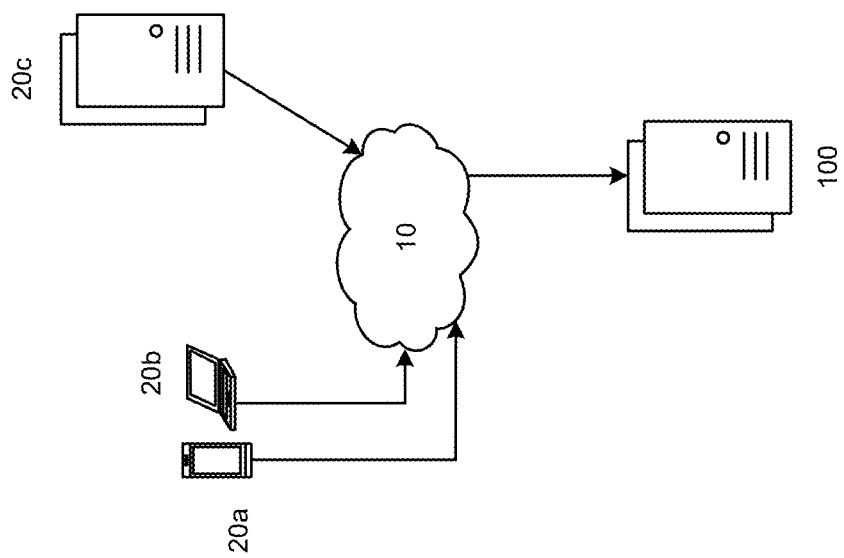
FIG. 1 is a network according to an embodiment of the invention.

Some embodiments may include some or all of the following components which are described in detail below:
Analytics Core:
  Unsupervised Learning:
    Network-based Behavioral Analytics
      The Community
      X-Files
    User-based Entity Behavioral Analytics
      Ghost
      Dark Matter
  Supervised Learning
    Targeted Behavioral Analytics
  Outlier Detection Algorithm(s)
    TailJumps
    Computerized Adaptive Detection
  Semi-Supervised Engine
    Janus
      Autonomous Machine Analyst
      Active Machine Analyst FIG. 1 is a network 10 according to an embodiment of the invention. Network 10 may be any network, including a public network such as the Internet, a private network such as a home or enterprise network, or a combination thereof. One or more computing devices 20 (e.g., 20a, 20b, 20c) may connect to one another and to other computers through network 10. For example, computing devices 20 may include user devices such as personal computers, smartphones, tablets, etc.; servers; switches; routers; and/or any other device capable of network communications. At least one platform server 100 may also connect to network 10. Platform server 100 may comprise one or more computers configured to provide the CALI platform described herein.

Figure 2:
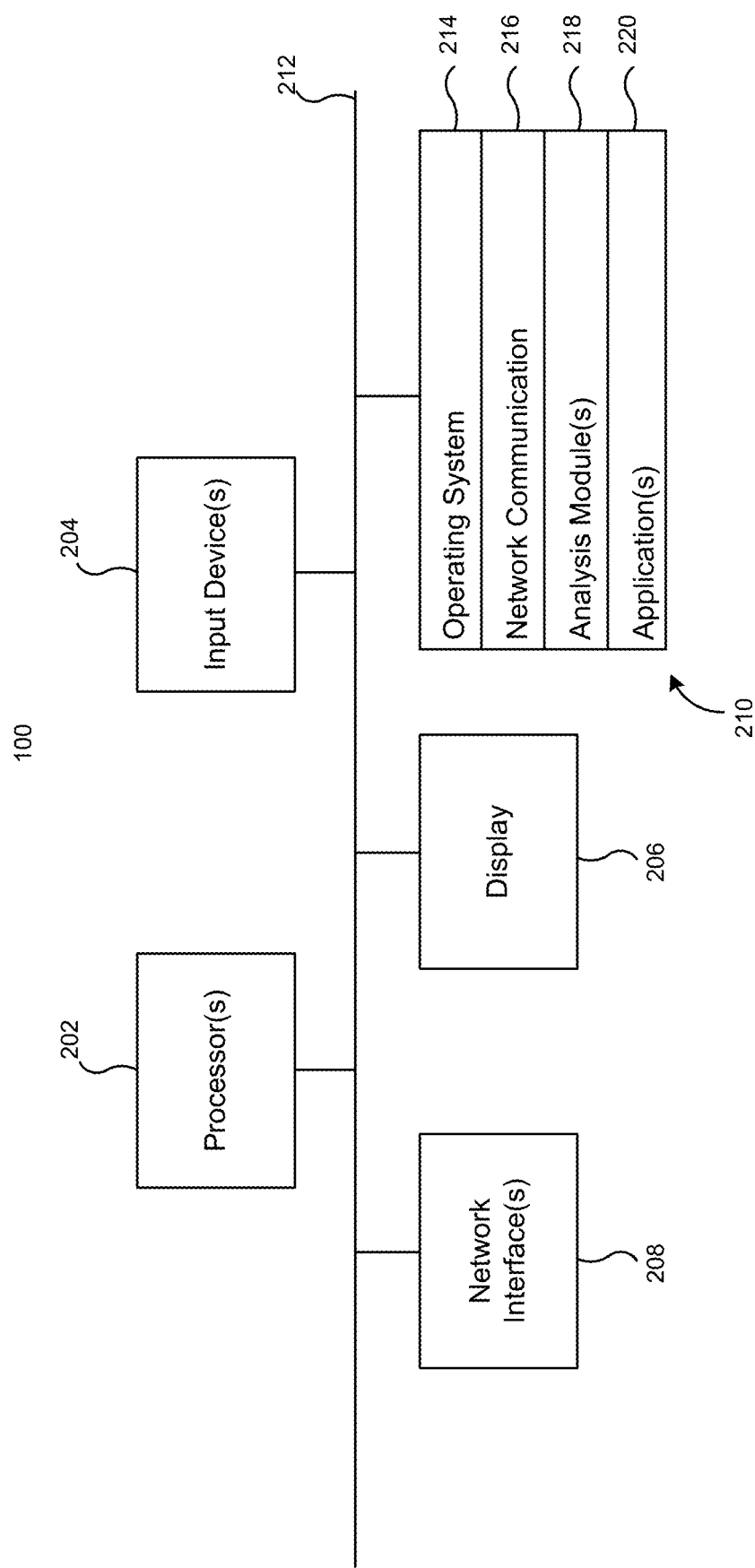
FIG. 2 is a block diagram of an example server according to an embodiment of the invention.

FIG. 2 is a block diagram of an example platform server 100 according to an embodiment of the invention. Server 100 may be implemented on any electronic device that runs software applications derived from compiled instructions, including without limitation personal computers, servers, smart phones, media players, electronic tablets, game consoles, email devices, etc. In some implementations, the server 100 may include one or more processors 202, one or more input devices 204, one or more display devices 206, one or more network interfaces 208, and one or more computer-readable mediums 210. Each of these components may be coupled by bus 212.

Display device 206 may be any known display technology, including but not limited to display devices using Liquid Crystal Display (LCD) or Light Emitting Diode (LED) technology. Processor(s) 202 may use any known processor technology, including but not limited to graphics processors and multi-core processors. Input device 204 may be any known input device technology, including but not limited to a keyboard (including a virtual keyboard), mouse, track ball, and touch-sensitive pad or display. Bus 212 may be any known internal or external bus technology, including but not limited to ISA, EISA, PCI, PCI Express, NuBus, USB, Serial ATA or FireWire. Computer-readable medium 210 may be any medium that participates in providing instructions to processor(s) 202 for execution, including without limitation, non-volatile storage media (e.g., optical disks, magnetic disks, flash drives, etc.), or volatile media (e.g., SDRAM, ROM, etc.).

Computer-readable medium 210 may include various instructions for implementing an operating system 214 (e.g., Mac OS®, Windows®, Linux). The operating system 214 may comprise any or all of: multi-user, multiprocessing, multitasking, multithreading, real-time, and the like. The operating system may perform basic tasks, including but not limited to: recognizing input from input device 204; sending output to display device 206; keeping track of files and directories on computer-readable medium 210; controlling peripheral devices (e.g., disk drives, printers, etc.) which can be controlled directly or through an I/O controller; and managing traffic on bus 212. Instructions for network communications 216 may establish and maintain network connections (e.g., software for implementing communication protocols, such as TCP/IP, HTTP, Ethernet, etc.).

At least one analysis module 218 can include instructions that may provide the features and functions of the CALI platform as described below. Application(s) 220 may comprise an application(s) that uses or implements the processes described below and/or performs other processes. The processes may also be implemented in operating system 214.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Platform Overview

Platform server 100 may provide an unsupervised learning engine. The unsupervised learning engine may include layered algorithms from various behavioral classes. These algorithms may learn various types of behaviors in network traffic and partition those behaviors in various groups. The behaviors that are least like the rest of the activity may be flagged as outliers. The following is an overview of some algorithms that may be used by platform server 100, which are each described in greater detail below.

The Network-based Behavioral Analytics (NBA) may look at the aggregate behavior of all users to find normal traffic and then look for dissonant behavior.

The X-Files family may include three algorithms, EdgeX, WeightX, and PeriodicityX, which may analyze complete network traffic in order to find anomalous activity. This family may analyze user behavior by considering the source IP address of the flow and the destination port. With this data, X-Files may compose a bipartite network where IPs connect to ports and ports to IPs.

The Community family may use five algorithms together to collectively find groups of nodes that are more connected to each other than to the rest of the network.

The User-based Entity Behavioral Analytics (UEBA) may examine the sequence of actions used by users to find normal user behavior and then find for anomalous behavior.

Ghost may include two pieces: Ghost1 and Ghost2. Ghost1 may include an unsupervised feature generation algorithm and an autoencoder (Ghost2) that may perform unsupervised outlier detection.

Dark Matter may include family of unsupervised clustering algorithms that may partition data into largely homogenized groups, and then Dark Matter may look for those observations that are unlike any other group.

Targeted Behavioral Analytics may include a family of supervised algorithms that may elucidate known patterns from known behaviors on a variety of data sources.

While each algorithm in the unsupervised core may model observations differently, the platform may standardize outlier definition for the sake of automation in some embodiments. TailJumps may involve a transformation of the outlier scores from each algorithm. TailJumps may break up the transformed outlier score into three distinct regions (Inliers, Analysis, and Forecast) and then look at Support Vectors in the Forecast region from the convex hull in the Analysis region to predict the outliers in the Forecast region. This may allow outlier detection to be defined with some often met assumptions in a universal manner to work across implementations, data sources, and algorithms without the need for adjustment.

Outliers may be driven by the unsupervised core engine. Outliers may be pruned by TailJumps, a distribution-free geometric approach to univariate outlier detection. The platform may be enhanced by differentiating between statistical anomalies and substantive anomalies. This aspect of the platform, called Janus, may learn from the outlier set and from humans using a multi-label semi-supervised classification algorithm with a self-learning mechanism and an active learning system.

Janus may include an Autonomous Machine Analyst that may learn by itself, based on human knowledge, and may mimic the hunting approach cyber analysts perform for threats of which it is certain. Janus may include the Active Machine Analyst that may enable the platform to learn faster and may ask the human for help when it is uncertain about a threat. Janus may use classes such as "forward" and "not forward" (Autonomous Machine Analyst) and "unknown" and "decision boundary" (Active Machine Analyst).

TailJumps may perform automated outlier detection. Janus may provide predictions about the novelty of an outlier. Together TailJumps and Janus can be joined for novelty detection.

Computerized Adaptive Detection (CAD) may comprise the combination of these two powerful components. Janus, based on feedback from the user (i.e., Oracle), may generate a loss function and automatically choose observations within the Analysis region of TailJumps to have the Oracle label with level of interest. This interaction may terminate when the loss function is minimized subject to constraints. Janus may minimize the loss function to find the optimal cutoff.

Figure 3:
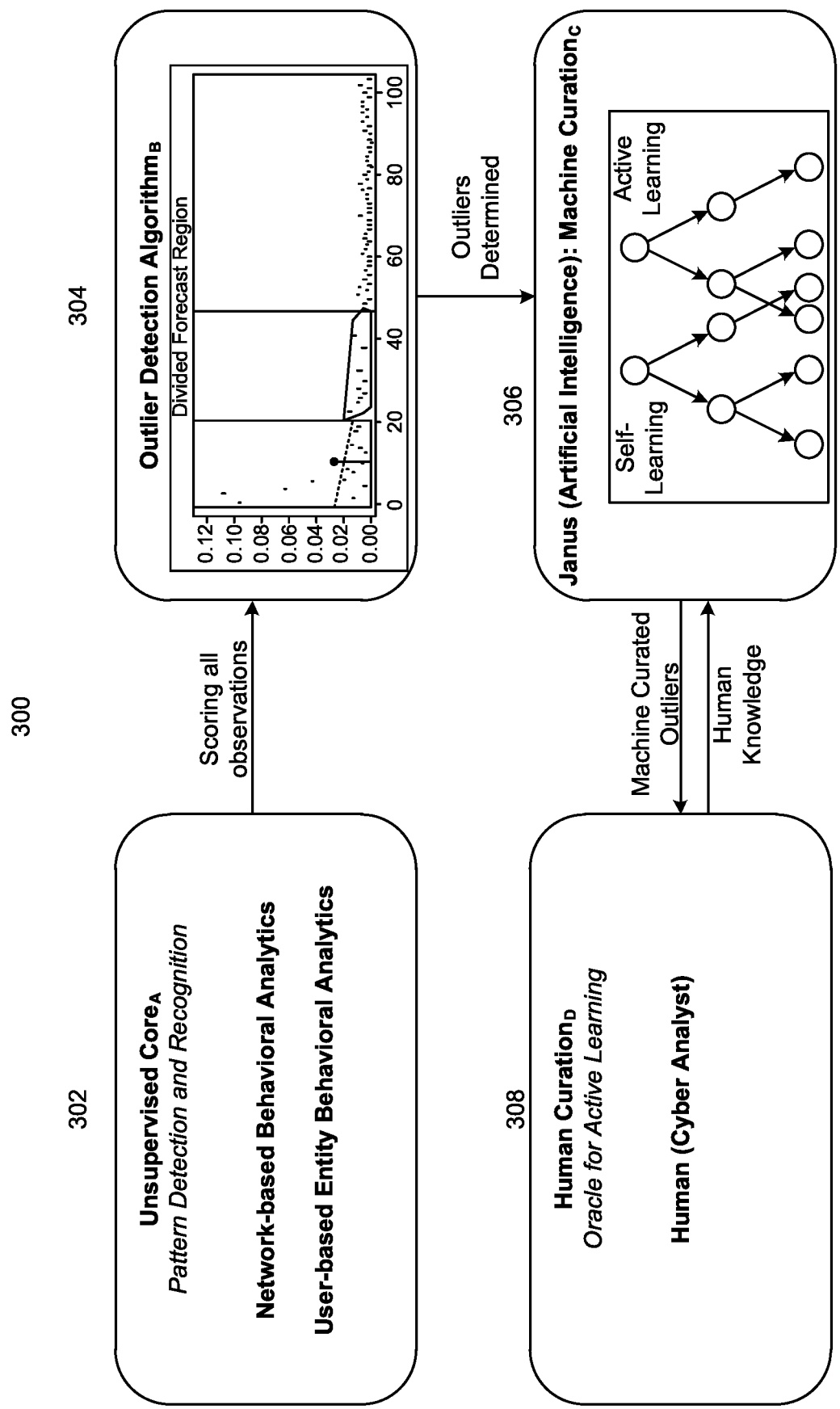
FIG. 3 is a platform overview according to an embodiment of the invention.

FIG. 3 is an overview of the platform 300, as executed by at least one platform server 100, according to an embodiment of the invention. Unsupervised learning core 302 may use network-based behavioral analytics and/or user-based entity behavioral analytics to score observations and produce score events. Outlier detection algorithm(s) 304 may produce a filtered set of outliers. For example, filtration and output are illustrated in detail below in FIGS. 17-20 and accompanying description. AI engine 306 may produce machine curated results using the filtered set of outliers as input. For example, yellow dots indicate steps in a self-learning process, and blue dots indicate steps in an active learning process, explained in greater detail with respect to FIG. 21 and accompanying description. Example outputs of these processes are shown in FIG. 25 and accompanying description. Human curation interface 308 may allow users to feed knowledge back to AI engine 306 in the form of labels.

Figure 4:
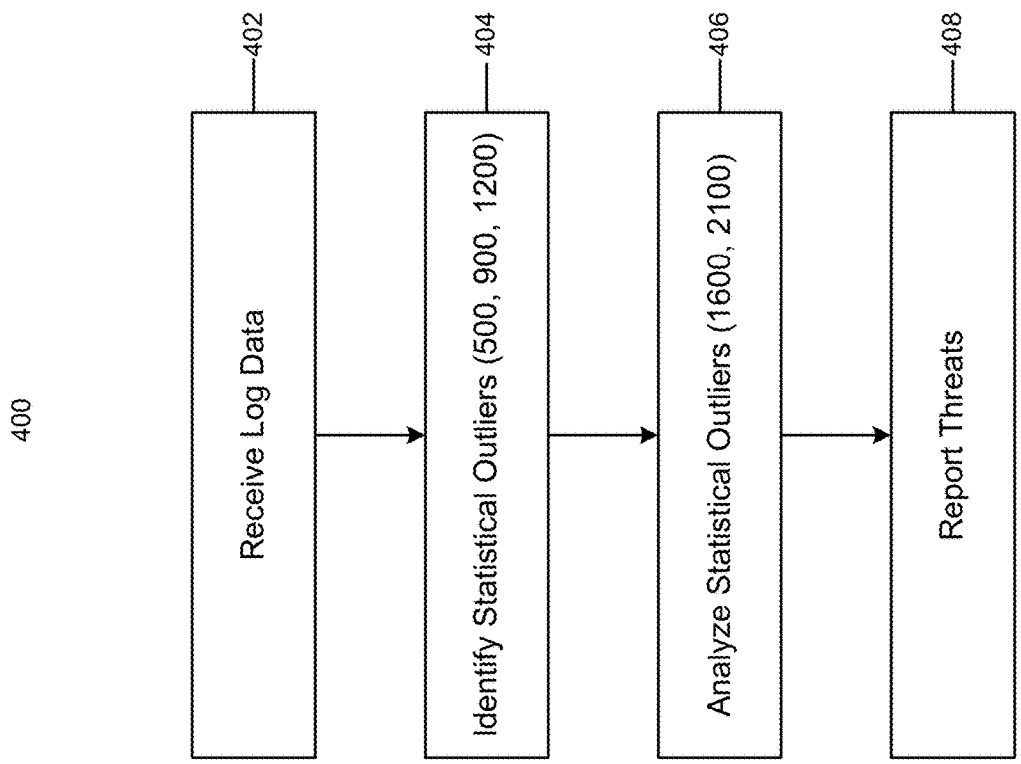
FIG. 4 is a platform process according to an embodiment of the invention.

FIG. 4 is a platform process 400 according to an embodiment of the invention. Platform 300, as executed by the at least one platform server 100, may perform process 400 to identify cybersecurity threats and/or other events of interest. In 402, platform 300 may receive log data (e.g., from devices 20 through network 10). In 404, platform 300 may identify statistical outliers in the log data. As described in greater detail below, the identification may be performed using Community (process 500), X-Files (process 900), and/or Ghost (process 1200) processing. In 406, platform 300 may analyze statistical outliers. The analysis may include TailJumps (process 1600) and/or Janus (process 2100) processing. In 408, platform 300 may report identified threats and/or other events of interest.

Community

Figure 5:
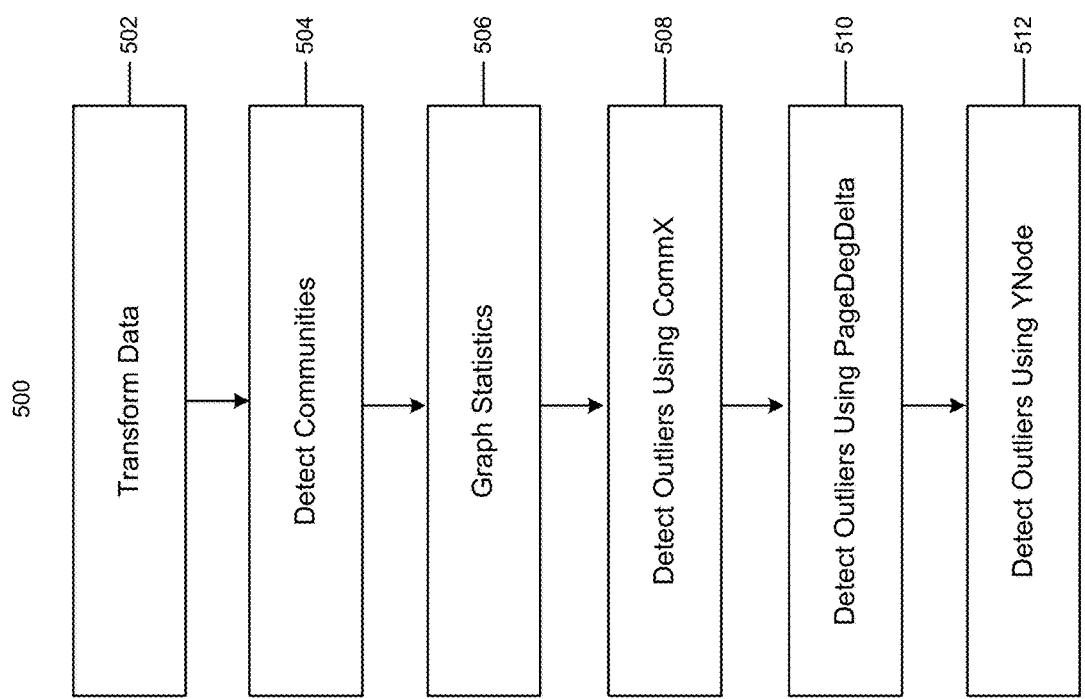
FIG. 5 is a community process according to an embodiment of the invention.

FIG. 5 is a community process 500 according to an embodiment of the invention. Platform 300, as executed by the at least one platform server 100, may perform community process 500 as one way to identify outliers that are potentially of interest. Community process 500 may find groups of nodes 20 on network 10 that are more connected to each other than to the rest of network 10.

In 502, platform 300 may perform data transformation. Cyber data, usually coming in the form of logs containing connections between IP addresses, has been traditionally thought of a network. The analytics described here may use this approach when analyzing this data, running, for example, one day at a time (e.g., five minute intervals over 24 hours). The log data, Netflow or Cisco ASA logs for example, may come in the form of a line with a timestamp, a source address, a destination address, and details about that connection including things like bytes and duration. For each of these analytics, each log line may represent an edge, or a connection, between two IPs, or two nodes 20. These edges may be consolidated by the pair of nodes 20 connecting them while respecting direction, i.e., an edge where IP 1 is the source address and IP 2 is the destination address is a different edge from one where IP 2 is the source address and IP 1 is the destination address, within a five-minute period (or other period in other embodiments) adding the number of flows from IP 1 to IP 2 as an edge weight. Each five-minute period set of edges may form a graph which can be represented as an adjacency matrix, $A_{ij}$, where each entry in the matrix is the number of flows between IP i and IP j during the same five-minute period. Platform 300 can run all of these analytics on all of the five-minute windows in a day (288) by concatenating the time window label with the IP creating a block adjacency matrix which takes advantage of the independence of each five-minute window to the next. Platform 300 can use the GraphX library in Spark to turn this edge list into a GraphX object, for example. Note that while five-minute windows for a single day are provided in this example, platform 300 may use time windows that can be defined in minutes (1-59), hours (1-24), or days (1-365). Platform 300 may perform comparison of values within time windows and between one time window and a set of time windows.

In 504, platform 300 may perform community detection. Community detection is a process that may find groups of nodes that are more connected to each other than the rest of the network. Once a GraphX object is available, platform 300 can then split each time window into groups of IPs that are more connected to each other than to the rest of the network, or communities. Splitting each window this way may allow platform 300 to analyze the meta-structure of the network. While there are many different methods of community detection, platform 300 may employ Louvain Modularity community detection due to its scalability in some embodiments. Louvain Modularity community detection, like many community detection algorithms, optimizes modularity Q, which is set forth below:

$$Q = \frac{1}{2m} \sum_{i,j} \left[ A_{ij} - \frac{k_i k_j}{2m} \right] \delta(c_i, c_j),$$

where $k_i = \Sigma_j A_{i,j}$ is the sum of the weights of the edges attached to node i, $c_i$ is the community label for node i, and the $\delta$ function $\delta(u, v)$ is 1 if u=v and 0 otherwise, and $$m = \frac{1}{2} \sum_{i,j} A_{i,j}.$$

Figure 6:
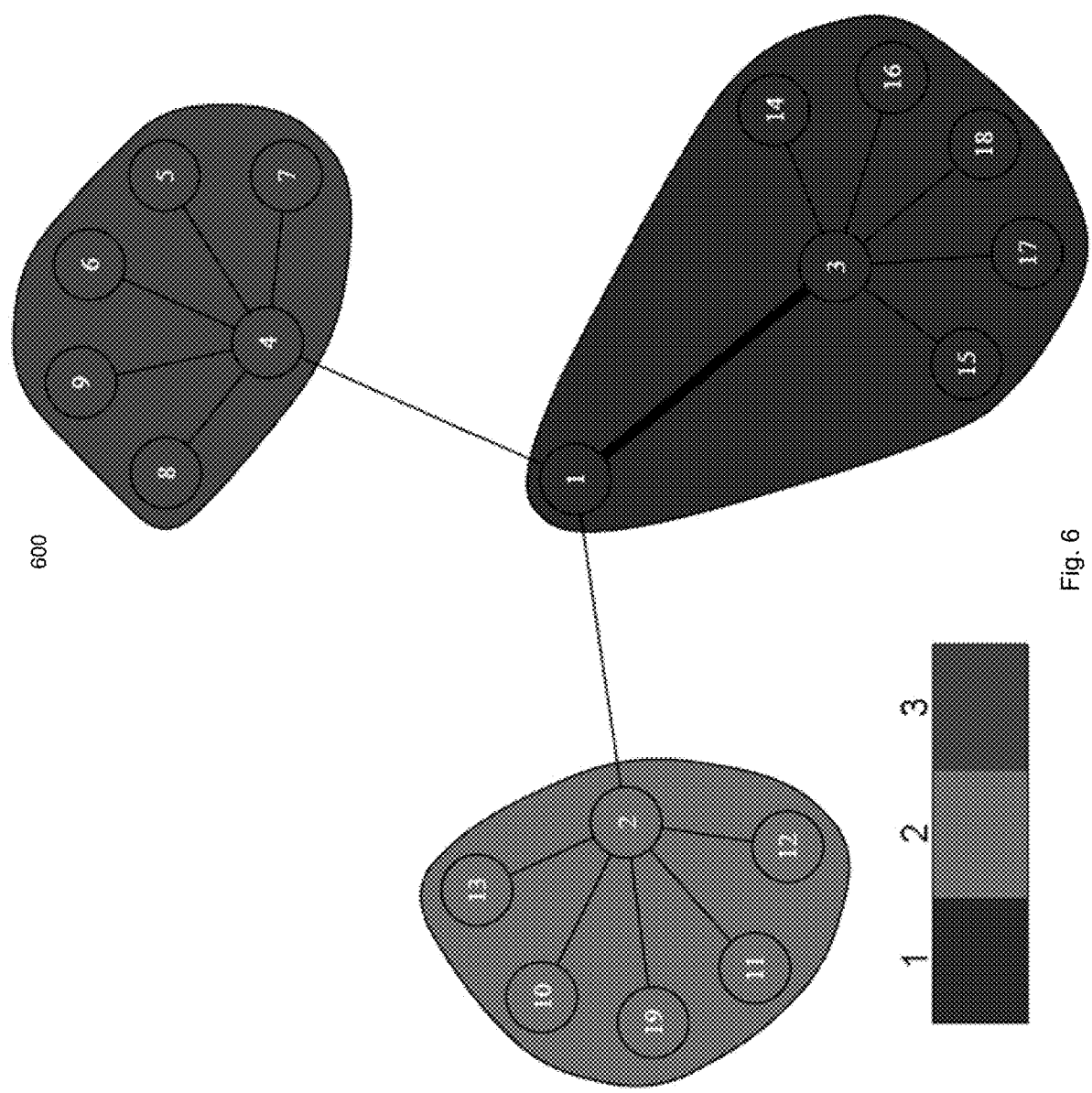
FIG. 6 is an example of community detection on a small test network according to an embodiment of the invention.

Optimizing modularity may allow platform 300 the freedom of discovering the best number of communities, as opposed to dictating the number beforehand. Louvain Modularity does not employ an exact optimization of modularity due to the computational complexity of this calculation on large networks but uses a very fast approximation. Louvain Modularity uses two phases that are repeated iteratively. First, all nodes are placed in their community. Then for each node i, platform 300 considers all j neighbors of i and evaluates the gain in modularity that would take place by removing node i from its community and placing it in the community of j. Node i is then placed in the community for which this gain is the largest, but it is only moved if this gain is positive. Part of the algorithm efficiency is that the gain in modularity $\Delta Q$ for moving a single node i into community C is computed by:

$$\Delta Q = \left[ \frac{\sum_{in} + k_{i,in}}{2m} - \left( \frac{\sum_{tot} k_i}{2m} \right)^2 \right] - \left[ \frac{\sum_{in}}{2m} - \left( \frac{\sum_{tot}}{2m} \right)^2 - \left( \frac{k_i}{2m} \right)^2 \right],$$

where $\Sigma_{in}$ is the sum of the weights of the edges inside C, $\Sigma_{tot}$ is the sum of the weights of the edges incident to nodes in C, $k_i$ is the sum of the weights of the edges incident to node i, and $k_{i,in}$ is the sum of the weights of the edges from i to nodes in C. The second phase of the algorithm builds a new network by transforming the communities found in the first phase into nodes by consolidating all nodes in a single community to a single node. These two phases are iterated until the gain in modularity is 0. FIG. 6 is an example of community detection on a small test network 600. The network 600 splits into three communities as illustrated by the colors in the figure. Due to the high weight between 1 and 3, 1 is placed in the purple community. These community labels may be used in the calculation of community betweenness and community size.

Due to the nature of cyber networks, platform 300 may add in another approximation to increase the algorithm's efficiency before employing Louvain Modularity. Cyber networks, compared with social networks, have a higher fraction of large degree nodes, or nodes with a high number of neighbors due to IPs that serve as DNS servers, domain controllers, email servers, and web proxies. Platform 300 may start by placing each neighbor of nodes with more than 1,000 neighbors in the center node's community. Then platform 300 may implement the second phase of the Louvain Modularity and algorithm. This additional step can reduce the number of iterations needed to converge on a community structure and may not significantly reduce the final modularity. Community detection produces a community label for each IP/time-window pair. These labels may be used to calculate some of the graph statistics below.

In 506, platform 300 may graph statistics. After creating the GraphX object and finding community labels for each IP/time-window pair, platform 300 may calculate the weighted degree, weighted PageRank, community size, and community betweenness for each IP/time-window pair. Weighted degree for an IP/time-window pair is defined as the total number of connections a single IP initiates in that time-window. The formula for weighted degree is illustrated below $$d_i = \sum_j A_{i,j}$$

Weighted PageRank is the weighted version of the PageRank statistic created by Larry Page at Google. PageRank is a measure of the importance of placement in the network for each IP within its time window. FIGS. 7A and 7B show the Weighted PageRank network 700 and Degree network 750, respectively, for the test network of FIG. 6. In the Weighted PageRank network 700, 1 has a higher PageRank than 2, 3, and 4 because 1 connects 2 to 3, 3 to 4, and 2 to 4, which all have a high number of connections, thus 1 may be considered more important because it connects highly connected nodes. The PageRank value is depicted in a sliding color scale, with the highest values signified by the darkest color, and the lowest values signified by the lightest color. For the calculation of PageDegDelta, platform 300 may use PageRank and degree values. Degree is a measure of the number of connections a node has. In the Degree network 750, degree value is depicted in a sliding color scale, with the highest values signified by the darkest color, and the lowest values signified by the lightest color. For the calculation of PageDegDelta, platform 300 may use degree and PageRank values.

Community size for an IP/time-window pair is the number of IPs in the same community as the IP in question during that time window. Because the calculation of betweenness may be computationally expensive, platform 300 may use a proxy for betweenness called community betweenness. For an IP/time-window pair, community betweenness is the count of the number of unique communities an IP connects to within the time-window.

$$\text{CommBetw}_1 = |\{C_{N(i)}\}|$$

where N(i) is the list of neighbors of node i and C is the vector of community labels.

To find outliers, platform 300 may use three analytics, called CommX, PageDegDelta, and YNode, each using a subset of the statistics described above. The analytics may compare each five-minute segment in a day to the rest of the five-minute segments for that day and calculate a final score to be fed into TailJumps and CAD to establish whether an observation is an outlier. While platform 300 may use all or only a subset of the three analytics in some embodiments, example process 500 includes all three.

In 508, platform 300 may detect outliers using CommX processing. For each IP/time-window pair, platform 300 may calculate the percent change of both the PageRank for the IP and the community size where percent change is defined as $$\Delta v_i = \frac{v_i - avg(v)}{avg(v)}$$

where $v_i$ is the value of the statistic for a particular time window, and avg(v) is the average of the statistic over all the five-minute windows. Platform 300 may filter the vectors to percent changes greater than zero for both PageRank and community size. Platform 300 may transform both vectors using a BoxCox transformation. The transformed vectors may be used for calculating the square of the Mahalanobis distance for each IP/time-window pair. This squared distance is distributed like a Chi-square distribution with two degrees of freedom, so platform 300 may choose a threshold for outliers by choosing a highly significant value for this distribution. Only IP/time-window pairs with scores passing this threshold may be returned as outliers.

In 510, platform 300 may detect outliers using PageDegDelta processing. For each IP/time-window pair, platform 300 may calculate the percent change of both the PageRank for the IP and the weighted degree where percent change is defined as $$\Delta v_i = \frac{v_i - avg(v)}{avg(v)}$$

where $v_i$ is the value of the statistic for a particular time window, and avg(v) is the average of the statistic over all the five-minute windows. Platform 300 may filter to percent changes of PageRank and weighted degree greater than 1. Platform 300 may transform both vectors using a BoxCox transformation. The transformed vectors may be used for calculating the square of the Mahalanobis distance for each IP/time-window pair. This squared distance is distributed like a Chi-square distribution with two degrees of freedom, so platform 300 may choose a threshold for outliers by choosing a highly significant value for this distribution. Only IP/time-window pairs with scores passing this threshold may be returned as outliers.

Figure 8:
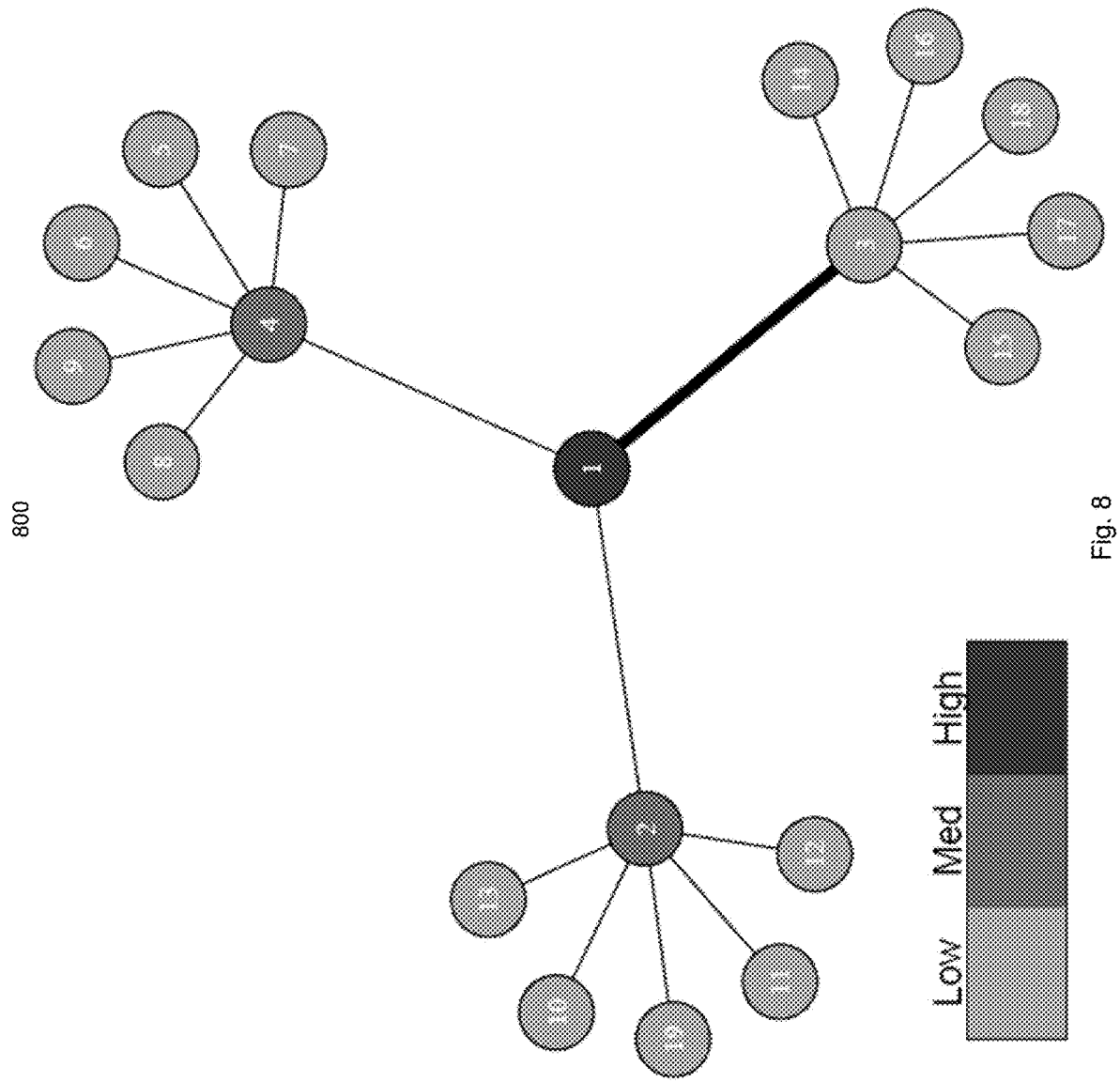
FIG. 8 is an example of betweenness according to an embodiment of the invention.

In 512, platform 300 may detect outliers using YNode processing. For each IP/time-window pair, platform 300 may calculate the percent change of both PageRank and community betweenness where percent change is defined as $$\Delta v_i = \frac{v_i - avg(v)}{avg(v)}$$

where $v_i$ is the value of the statistic for a particular time window, and avg(v) is the average of the statistic over all the five-minute windows. We then filter to percent changes of PageRank greater than 0 and percent changes of community betweenness greater than 1. We then transform the community betweenness scores using a BoxCox transformation. We then calculate the Z-score for percent change community betweenness, where the Z-score is the number of standard deviations away from the mean. Only IP/time-window pairs that have a Z-score greater than three are returned as outliers. FIG. 8 is an example of betweenness in an example network 800. Using community detection (as shown in 600 above, for example), platform 300 may calculate another importance score, Community Betweenness. Community Betweenness (shown in 800, for example) is the count of the number of communities a single node connects. This value is depicted in a sliding color scale, with the highest values signified by the darkest color, and the lowest values signified by the lightest color. For the calculation of YNode, platform 300 may use PageRank (shown in 700, for example) and Community Betweenness (shown in 800, for example) values.

X-Files

Figure 9:
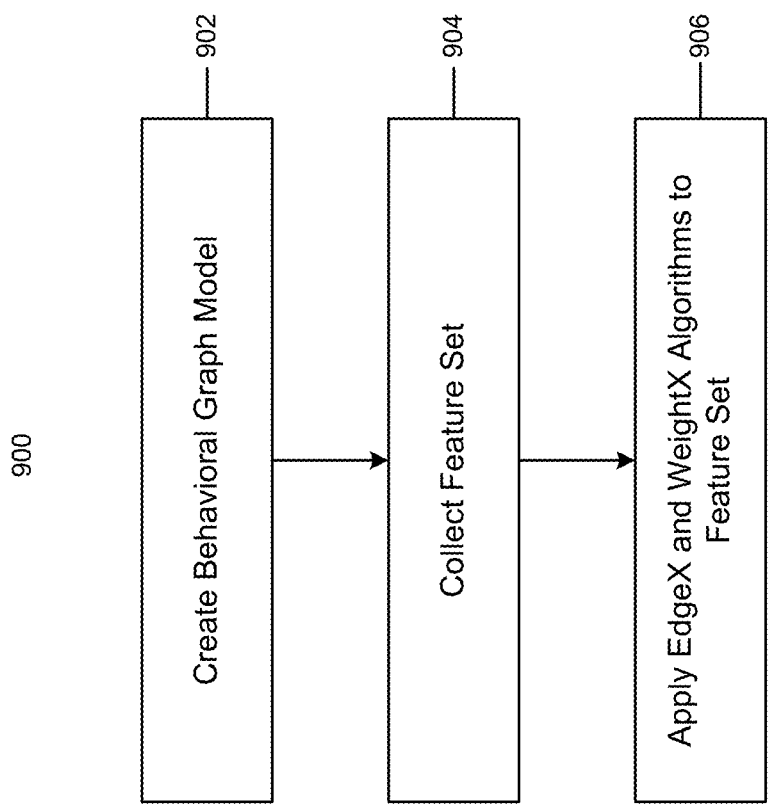
FIG. 9 is an X-Files process according to an embodiment of the invention.

FIG. 9 is an X-Files process 900 according to an embodiment of the invention. Platform 300, as executed by the at least one platform server 100, may perform X-Files process 900 as one way to identify outliers that are potentially of interest. X-Files process 900 may use network-based behavioral analytics to identify the outliers.

In 902, platform 300 may create a behavioral graph model, for example using GraphLinear. GraphLinear may comprise a set of graph analytics for detecting suspicious user behavior in flow data (e.g. Netflow, Firewall, etc.). To detect suspicious behavior in network traffic, platform 300 may create a behavioral graph model using source IP addresses and destination ports. In this graph, IP addresses and destination ports may be represented as vertices, and edges may be used to connect an IP address and the destination ports accessed by that user. This forms what may be referred to as a bipartite graph, where there are two separate types of vertices which cannot connect to other members of the same group, where in this case IPs and ports are considered separate groups. This is in contrast to unipartite graphs where there is only a single group of vertices, e.g. IP to IP connections. The use of bipartite graphs in these algorithms may be beneficial in two ways: platform 300 can map a user's behavior by the services they are requesting, and platform 300 can reduce computation time as bipartite graphs are less dense than unipartite (i.e. fewer connections). FIG. 10 depicts an example adjacency matrix 1000 for a bipartite graph.

In 904, platform 300 may collect a feature set. Once the bipartite graph is formed, a set of features for each IP address may be collected which will be used in either the EdgeX or WeightX algorithm as discussed below. Feature extraction for the algorithms may start with extraction of the egonet, or the one-hop neighborhood of the given vertex. In the bipartite graph, the egonet may be seen as the equivalent of looking at the direct connections of the given vertex (e.g., the ports to which an IP connects). Three features may be extracted from the egonet, or subgraph: 1) number of edges, 2) total weight, 3) principal eigenvalue of the adjacency matrix. The first two features express the number of distinct ports connected to and the total flows for a user, respectively. The final feature, the principal eigenvalue of the adjacency matrix, in general, may require a more involved process where a subgraph for each user is gathered, and an adjacency matrix must be formed. The process of extracting these subgraphs and building the adjacency matrix from which the principal eigenvalue is calculated may be the most time-intensive aspect of the feature extraction process. However, since a bipartite graph has a special type of adjacency matrix (see FIG. 10, which is an adjacency matrix for a single user in a bipartite network between source IP addresses and destination ports), platform 300 can perform a simple calculation to get the principle eigenvalue without the need for extracting a subgraph for each vertex. Since the adjacency matrix is a vector 1010 for a bipartite egonet, the following equation can be used to calculate the principal eigenvalue. This feature of the adjacency matrix may lead to a greater than 100× speedup in computation time compared to extracting a subgraph for each user.

$$\lambda = \ln\left(\frac{\sqrt{4 * adj^T \cdot adj}}{2}\right)$$

where adj is the adjacency matrix.

In 906, platform 300 may identify outliers. The three features computed from the vertex egonet for each user may be used in the EdgeX and WeightX algorithms to detect anomalous behavior. The EdgeX algorithm may use the egonet number of edges and total weight. The WeightX algorithm may use the total weight and principal eigenvalue. There may be certain features of egonets that appear to follow a power law, creating linear relationships which can be used to detect anomalous data points, i.e., users. Two such relationships may be applicable for cybersecurity applications, reported as EdgeX and WeightX.

The first computational step for both EdgeX and WeightX may include a log transformation of the features. The two features for each algorithm (as outlined above) may be plotted in a two-dimensional plane from which a linear regression is performed. The linear regression may use a least squares approach to finding the best-fit line for the data, whereby the residual for each data point is computed and the sum of the square of the residuals in minimized. The residual value or deviation from the best fit line for each data point may be used to detect whether a data point (i.e. user) is an outlier. The mean and standard deviation of residuals may be computed, and data points which have a residual greater than, or less than, three standard deviations from the mean may be flagged as outliers.

Ghost

Figure 11:
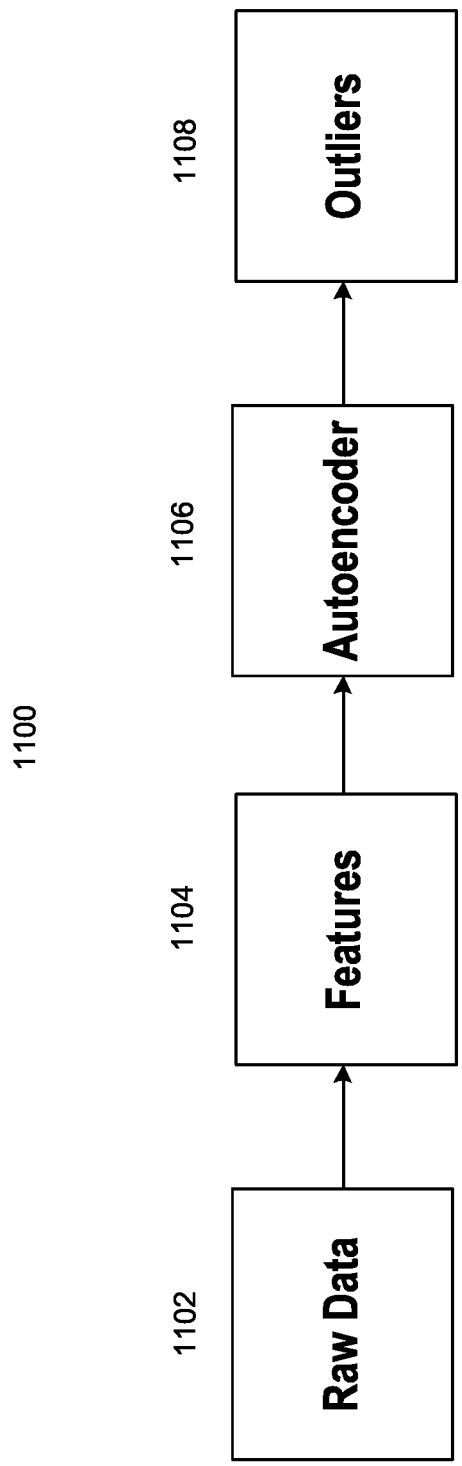
FIG. 11 is a data flow for a Ghost process according to an embodiment of the invention.
Figure 12:
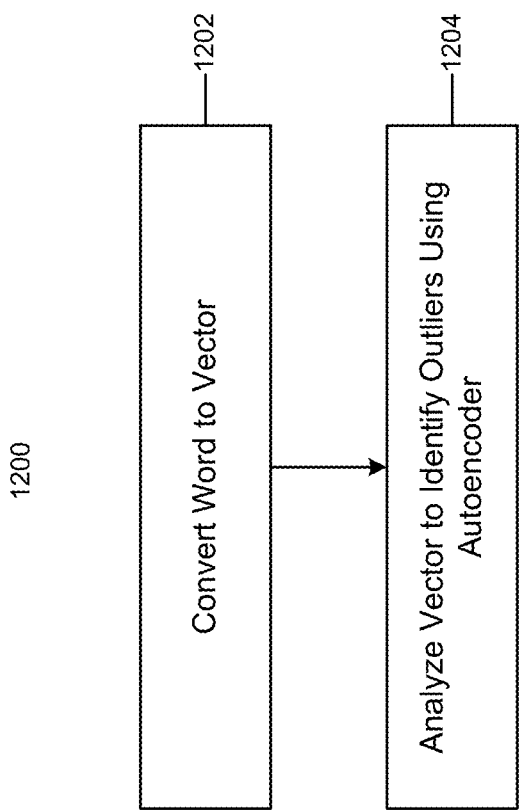
FIG. 12 is a Ghost process according to an embodiment of the invention.

FIG. 11 is a data flow 1100 for a Ghost process, and FIG. 12 is the Ghost process 1200 according to an embodiment of the invention. Platform 300, as executed by the at least one platform server 100, may perform Ghost process 1200 as one way to identify outliers that are potentially of interest. Ghost process 1200 may use an unsupervised learning algorithm to identify the outliers. As shown in FIG. 11, platform 300 may ingest raw data (e.g., Netflow, ASA firewall logs, and Windows security logs) 1102, generate features 1104, perform autoencoder analysis 1106, and output outliers 1108.

Ghost may include an unsupervised learning algorithm to identify statistical outliers in cyber security data. There may be at least two pieces: the feature generation process which may extract meaningful features from raw data, and the outlier detection piece which may use the features from the previous process. Ghost may determine outliers using statistical thresholds from standard deviations. The final output may be in the form of log lines grouped by the entity that was flagged as anomalous by platform 300.

In 1202, platform 300 may perform feature generation by converting word(s) to vector(s). Platform 300 may implement Word2Vec, a natural language processing algorithm developed by Google to convert human text words to mathematical vectors that a computer can understand, or a similar algorithm. Platform 300 may utilize the skip-gram method, which uses a target word to predict a context window of words surrounding the target word. This method may create vectors that encode the meaning of the corresponding word. In this way a computer can understand, for example, that the words "red" and "blue" are similar, whereas "red" and "cat" are not. The dimensionality may be set at 60 for the word vectors in some embodiments. Platform 300 may run Word2Vec over cyber data, where the sentences for NetFlow are of the form "source IP, destination IP, destination Protocol Port, hour of the day," for example. For ASA logs, sentences are of the form "source IP, destination IP, destination Protocol Port, log 10(bytes), the hour of the day," for example. Windows Security logs are of the form "account name, event code, object, hour of the day," for example, where "object" is dependent on the event code's information. For example, the object could be the workstation a user logged in from or the username of a password that an administrator changed.

FIG. 13 is an example target word prediction 1300 according to an embodiment of the invention. In 1302, Word2Vec scans across sentences. In 1304, Word2Vec uses a context of words to predict a target word. In 1306, Word2Vec assigns each word in the vocabulary a vector weight of dimension N. The vector values are updated as Word2Vec trains, and the resulting vectors are the final output. The dimensions of the vectors encode the meaning of the words.

Figure 14:
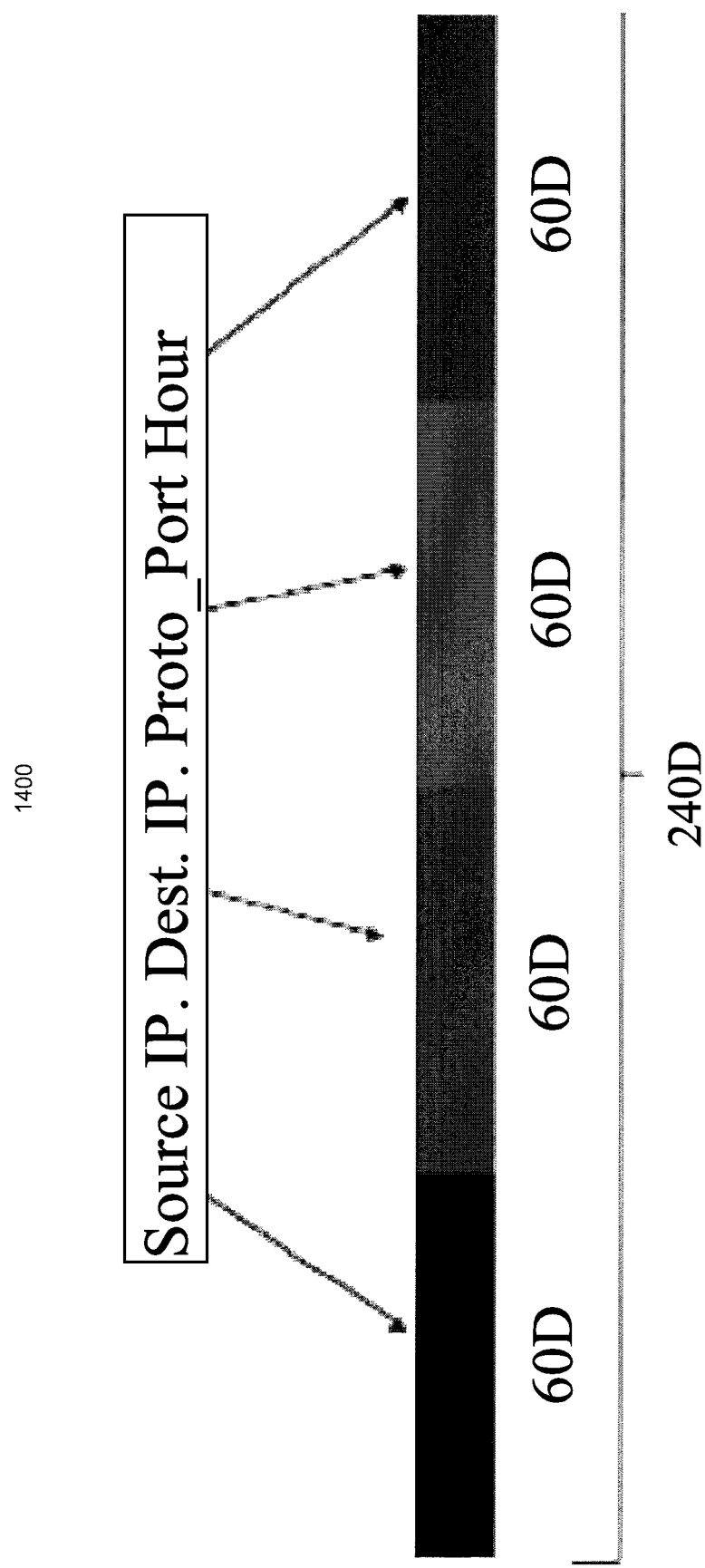
FIG. 14 is an example vector for NetFlow data according to an embodiment of the invention.

Each word may have an associated vector. For example, TCP_80 will have a distinct vector from TCP_443 or Source IP 10.xx.xx.xx. To prepare these features for use in the outlier detection piece, each word in the sentence may be concatenated together. For example, FIG. 14 shows an example vector 1400 for NetFlow data. For NetFlow data, there are four words in a sentence as described above. Since each word is 60 dimensional, the final, concatenated vector 1400 has a dimensionality of 240.

Figure 15:
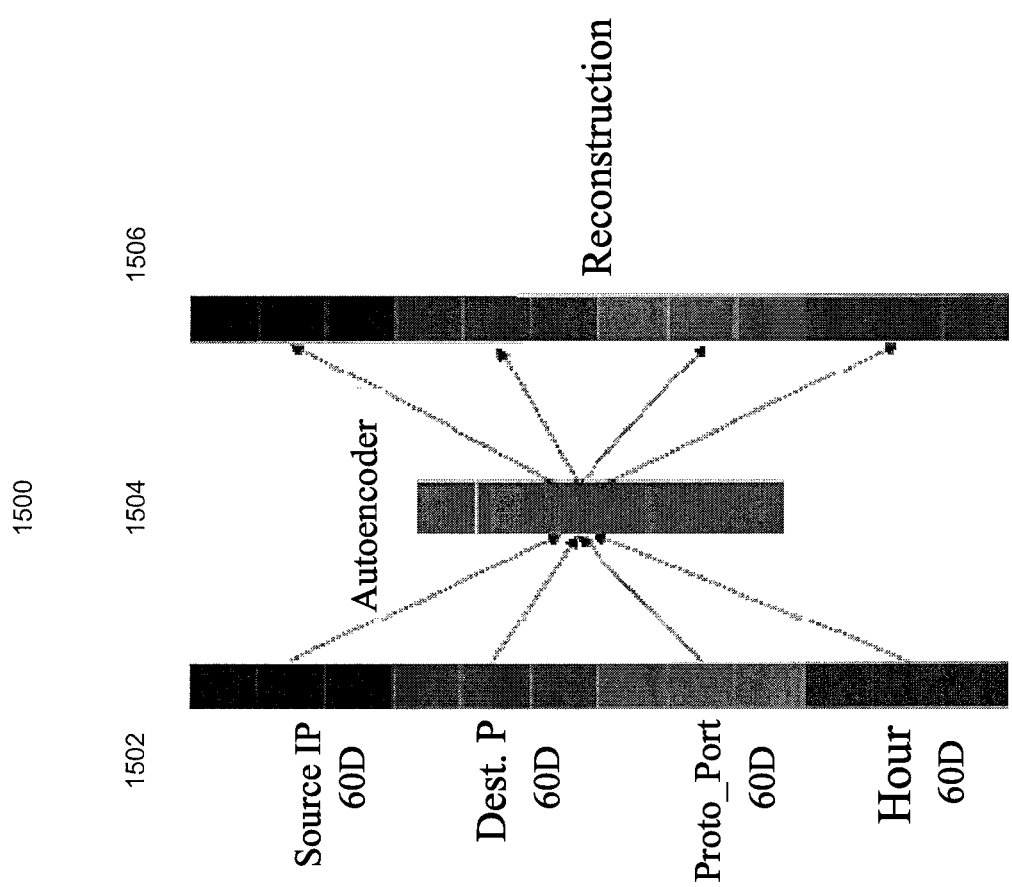
FIG. 15 is an example autoencoder flow according to an embodiment of the invention.

In 1204, platform 300 may analyze a vector(s) to perform outlier detection. Platform 300 may use a specific neural network known as an autoencoder to detect outliers. FIG. 15 is an example autoencoder flow 1500, wherein a vector 1502 is fed to an autoencoder 1504, and autoencoder 1504 outputs a reconstruction 1506. Autoencoder models may be designed to reconstruct the input data correctly. A measure of how well they do this is known as the reconstruction error. An autoencoder 1504 with low reconstruction error can accurately model 1506 the input data 1502 and thus has learned the underlying structure of the data. Thus, if platform 300 can model the structure of the data, platform 300 can find deviations from this structure, and then determine outliers. Outliers may be determined from the aggregate reconstruction error of each log line. Standard deviations from the mean reconstruction error determine the outlier score for a given log line, where the mean is taken over the reconstruction error of all log lines. Reconstruction error may be calculated via the cosine proximity of the reconstruction and the input vector.

Ghost may be scalable. For example, in one embodiment Ghost may be written in Python and pySpark allowing it to scale to large datasets. It may use several open source libraries, such as Keras, Deepdist, and numpy. Depending on the customer size, Ghost may be run on either daily or hourly batches. Once Ghost has analyzed a batch of data, only those log lines considered to be outliers may be produced and written to a HIVE table for Janus to ingest as described below.

DomainX

DomainX is an analytic that may detect domain generation algorithms (DGA) in DNS data. The intuition for the creation of the model is that domain generation algorithms may generate DNS requests that are lexically different than those created by humans. Given a sufficient number of lexical features to define a given domain as algorithmically generated or not, a classifier built on known DGAs and the most common globally visited domains may be built. The resulting DNS requests defined as originating from a DGA may be aggregated by user to reduce false positives.

The DomainX model may include a feature generation engine and random forest two-class classifier. Platform 300 may use the model to analyze each domain separately rather than grouping requests from a particular client. In order to build the model, samples of known DGAs representing different generative processes (e.g. all characters drawn from a universal distribution, modifying existing words through character replacement) and the Alexa ten thousand were used as positive and negative samples respectively. The entity of interest for the model may be the effective second level domain (E2LD). This value may be defined by comparing each domain to an exhaustive list of possible effective top level domains (ETLD). For large content providers (e.g. Cloudapp, AWS) the ETLD may include the 2LD (e.g. cloudapp.net).

Each E2LD may be broken down into five characteristic features:

1. String length: Length may be between 1 and 63 characters long. Domains with a length of less than 6 characters may be discarded.

2. String entropy: Measure the disorder in characters used. Common domains may often use easy to pronounce words, unlike randomly generated domains.

3. Consonant to vowel ratio: Standard language constructs that may define typical vowel usage. Algorithmic generation may utilize different ratios to expand possible character combinations.

4. Alexa ten thousand n-gram TF-IDF: Measures the n-gram (3 and 4 grams) similarity to the ten thousand most visited sites. Higher scores may suggest the generative process for the domain is more similar to common domains.

5. Dictionary n-gram TF-IDF: Measures the n-gram (3 and 4 grams) similarity to dictionary words. Higher scores may suggest the generative process for the domain is more similar to English vocabulary.

N-grams may be built by walking across each domain and capturing a tuple containing the defined number of characters (i.e. 3 and 4). For example, for the domain google, the first two 3-grams would be (g,o,o) and (o,o,g). The n-gram lengths chosen may collect enough meaningful structure from the domains without introducing significant noise (e.g. 2-grams introduce significant noise, particularly for shorter domains where an acronym for a company name may be used). Platform 300 may use a modified version of TF-IDF for this implementation to improve classifier performance. Instead of multiplying the raw frequency of the n-gram by the log of the inverse document frequency (total number of n-grams divided by the number of n-grams in the training set), platform 300 may multiply the raw frequency of the n-gram by the log of the number of times the n-gram appeared in the domain.

A decision tree classifier may be trained on the features above for both the sample DGAs and Alexa ten thousand. The cutoff point may be determined by building a receiver operating characteristic curve to choose an appropriate value to reduce false positives and false negatives in a balanced way.

In practice, the model trained with the sample data described above may be applied to each of the domains in a day's worth of DNS traffic (or other time interval of interest). Each domain may go through feature extraction and model prediction. Once all of the domains have been analyzed, those domains flagged by the model as representing a DGA may be aggregated for each client. Platform 300 may employ a heuristic whereby clients with less than twenty flagged domains are discarded. Those clients remaining may be deemed to have a DGA present.

User Agent Anomaly Detection

User Agent Anomaly Detection (UAAD) is a recurrent neural network (RNN) that may classify user agents. For example, platform 300 may classify user agents into three general categories: benign, random character, and attack-like (e.g., SQL injection). UAAD may be trained offline with static data. UAAD may look at the character-level for user agents and embed each character into a 20D vector. The RNN may read the characters sequentially from left to right and make a classification. UAAD may discard any user agent that is not sufficiently unique (e.g., set as less than 10 total occurrences).

Training for UAAD may be performed offline using a data set composed of known-benign user agents, random string characters, and known-attack like user agents. The training data may include a mix of open source data and proprietary data gathered from research on customer data. Once the model is trained, platform 300 may use the model to classify new user agents in real-time without the need to retrain. The model may also be trained again as new relevant training data becomes available.

Figure 27:
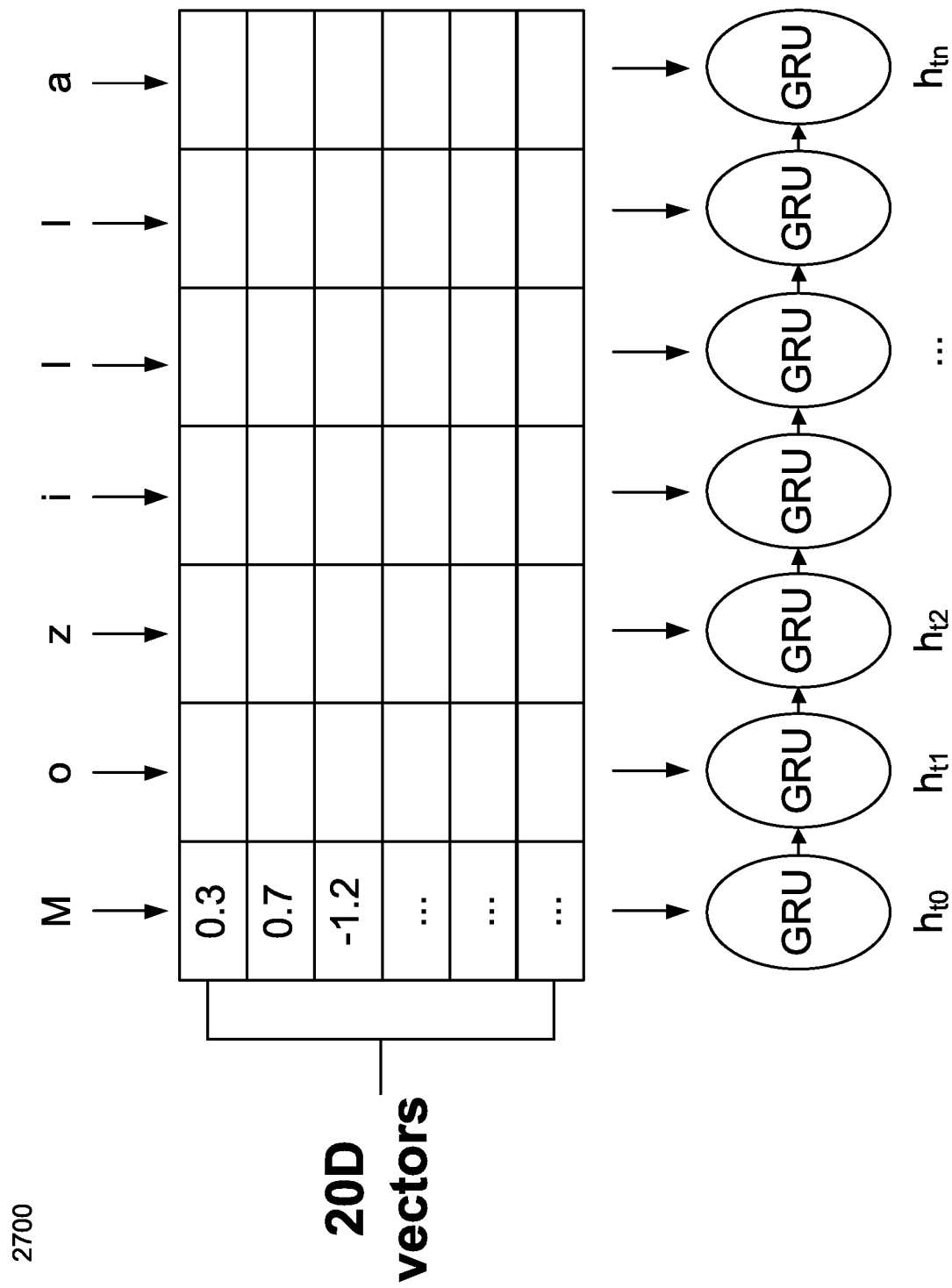
FIG. 27 is an example character-level classification according to an embodiment of the invention.

FIG. 27 is an example character-level classification 2700 according to an embodiment of the invention. The input data may be evaluated at the character level. For example, if an example user agent is "Mozilla", the agent may be analyzed from left to right, starting with the character "M". During the training phase, each character may be assigned to a random 20 dimensional vector of real numbers. As the model learns to classify user agents, these vectors may be automatically updated by the algorithm to help the model correctly classify agents. Each dimension may encode some semantic meaning of the character. For example, the model may find that capital letters are all similar, or that vowels are similar, and thus "push" these characters further into the same dimension.

The model itself may be a specific type of RNN: Gated Recurrent Units (GRU), which is itself a type of neural network algorithm. RNNs may be designed to read sequential data; in this case, user agents evaluated at the character level. The GRU may include hidden units with a hyperbolic tangent activation function. As each 20D embedded character is read, each hidden unit may be updated via a dot product with the 20D vector, as shown in FIG. 27. In addition to the hidden units seeing the new character, they may be fed the hidden units' weights before having been updated by the new character. As an example, if ht are the hidden units at time t, then ht+1 sees both ht and ct+1, the character at time t. After the entire agent has been read, these 10 hidden units may be connected to a 3-hidden unit softmax layer that outputs the final classification. The entire model, including the embedding layer that converts the characters to 20D vectors, may be trained using a type of stochastic gradient descent algorithm known as RMSprop. As the input data uses proprietary data, the final learned weights of the model may be proprietary.

Caraway

Caraway is a system that may provide fully unsupervised detection of DNS clients that use a domain generation algorithm (DGA) to produce some subset of the domain names they query. Caraway's design may be motivated by the intuition that an essential property of the algorithmically generated domains (AGDs) queried by a given DGA-using client is that they all may be generated by the same process. Any given DGA might produce domains which resemble "normal" domains to a greater or lesser absolute degree, but the DGA's generated domains may resemble each other. Unless the DGA perfectly matches the mix of processes producing all the domains resolved organically within a given network, then the AGDs may resemble each other to a greater degree than we would expect to observe by chance alone.

Caraway may employ a Bayesian hierarchical model for a generative process realizing this intuition and a process for applying this model to infer which DNS clients appear to be using DGAs.

The core of Caraway may include a generative probabilistic model. This model may be divided into two sub-models for conceptual convenience and modularity, the domain generation model and the DNS query model. The model described below is an instance of a family of models which express a sequence of generated domain names as a discrete-time stochastic process. However, some embodiments may model each domain name as independent given only the generating process parameters.

Each individual domain name may be broken into the following constituent parts:

ETLD: The domain name effective top-level domain. ETLDs are DNS domain names managed by domain registries or private organizations such that each immediate child domain may be managed by a distinct external entity.

E2LD label: The effective second level domain label registered with the ETLD operator.

Child labels: Any additional labels below the E2LD label.

Platform 300 may generate a domain name by the following process:

Choose the ETLD a $\sim$Cat($\omega$). Deeper may be possible, such as separately treating IANA versus private ETLDs, but this may add complexity.

Choose the E2LD label length n $\sim$Cat(v). Each DNS domain label may be between 1 and 63 characters in length. Modeling this selection as categorical supports any arbitrary empirical distribution.

Choose the E2LD label characters $c_i \kappa_i -1 \sim \text{Cat}(\gamma_{[ci-1]})$, $i \in \{1, \ldots, n\}$. Treat c0 as a special "label pre-initial" character. The label characters may then form a Markov chain via bigrams.

Choose the number of child labels m$\sim$Cat($\eta$). In practice, platform 300 may bound the maximum value of m to 1 and consider only domains with m=0 versus m>0 child labels. Note that platform 300 need not consider the actual label length and content in some embodiments.

Where the exact details of generation by the above or similar process are irrelevant, platform 300 may collect $\psi = (\omega, v, \gamma, \eta)$ and denote generation of a domain name d by d$\sim$DG($\psi$).

Platform 300 may also consider the generation of the domain generation parameters themselves, providing prior distributions for the components of a given $\psi$. Given a smoothing hyper-parameter $\alpha$, platform 300 may then apply the following process:

1. Choose $\omega \sim \text{Dir}(R, \alpha)$, where R is the number of possible distinct ETLDs.

2. Choose $v \sim \text{Dir}(L, \alpha)$, where L=63 is the number of possible distinct label lengths.

2. Choose $\gamma c \sim \text{Dir}(C, \alpha)$, $c \in \{0, \ldots, C\}$, where C is the number of possible distinct label content characters.

Choose $\eta \sim \text{Dir}(M, \alpha)$, where M is the number of possible distinct child label counts.

More complicated priors may be possible. Where the exact details of generation by the above or similar process are irrelevant, platform 300 may denote generation of the parameter collection $\psi$ by $$\psi \sim DG^{-1}(\alpha).$$

The exact details of the domain generation model here-described are intentionally simple and fairly malleable. Changes to the domain generation model may not necessarily induce significant changes in a Caraway implementation.

Caraway: DNS Query Model

The Caraway DNS query model may provide a generative probabilistic model of the observed DNS queries within a corpus of network traffic, described as the result of a mixture of a network-wide "background noise" DGA and isolated per-client "non-noise" DGAs. Platform 300 may divide the corpus into a set of one or more networks I, each containing a set of clients C, each of which perform a set of DNS queries D. In this context, the following may be defined as observed random variables:

For each network, $\psi 0$ is the collection of parameters for the network background noise domain generation model. In practice these may be inferred from a sample of domains from the network, but for the purposes of the DNS query model, they may be treated as directly observed.

For each DNS query, d is the queried domain name.

Figure 28:
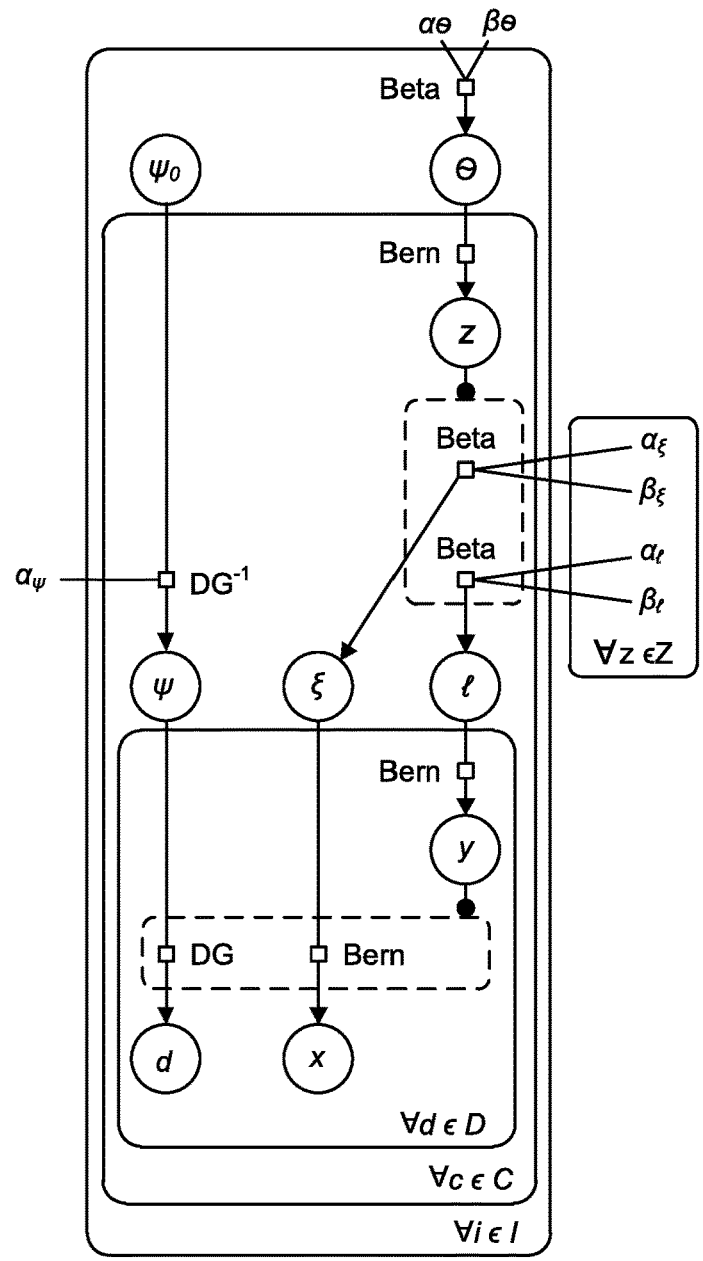
FIG. 28 is a directed factor graph according to an embodiment of the invention.

For each DNS query, when the response is available, x is the binary resolution result (successful or unsuccessful). The following generative process may be assumed for the set of DNS queries, also depicted in FIG. 28 as a directed factor graph 2800:

1. For each network, choose $\theta \sim \text{Beta}(\alpha_\theta, \beta_\theta)$.

2. For each client, (a) Choose $z \sim \text{Bern}(\theta)$. This latent variable may determine whether the client selects domains to query via a coherent non-noise DGA (z=1) or not (z=0).

(b) Choose $\varphi \sim \text{Beta}(\alpha_{\varphi[z]}, \beta_{\varphi[z]})$. The parameter $\varphi$ is the probability of each queried domain being chosen via the client's non-noise DGA. Thus its prior may have different parameters conditional on the value of z.

(c) Choose $\xi y \sim \text{Beta}(\alpha_{\xi[z,y]}, \beta_{\xi[z,y]})$, $y \in \{0, 1\}$. Each parameter $\xi y$ is the probability that a queried domain successfully resolves conditional on the value of the latent variable y for that query, as described below. Thus its priors may have different parameters conditional on the value of z.

(d) Choose $\psi 1 \sim DG-1(\alpha_\psi)$. This will be the model parameters for any non-noise domains the client queries.

(e) For each of the N DNS queries,

Choose $y \sim \text{Bern}(\varphi)$. This latent variable identifies whether or not this particular domain is selected via the noise DGA (y=0) or the client non-noise DGA (y=1).

Choose $d \sim DG(\psi[y])$.

Choose $x \sim \text{Bern}(\xi[y])$.

The behavior of this process may depend on the choice of parameters for the prior of θ and the z-dependent priors of ψ and $\xi_1$. Chosen appropriately, z=1 may imply the unlikely event that the client mostly queries domains which look more like each other than like noise and which tend not to resolve, while z=0 implies the more likely opposite.

As discussed in the next section, useful inference using the DNS query model may be dependent on the model's exact structure. At least in terms of the current algorithmic approach, changes to the DNS query model may have significant impact on an Caraway implementation.

Caraway: Inference

One inferential goal may be to estimate the value of z for each client, and for clients where z=1, estimate the value of y for each DNS query, which platform 300 may collect as the per-client vector y. Calculating the full joint probability distribution for the DNS query model may be intractable even if only considered per client, but the hierarchical structure may largely reduce the distribution to individually simple independent factors. This factorization may support a variety of possible inference algorithms and approaches.

Since platform 300 seeks to identify the most likely values of z and y, platform 300 may perform maximum a posteriori point estimation via the expectation-maximization algorithm. For this choice of algorithm, the problem may be further simplified by fixing z and separately estimating the remaining latent variables for both z=0 and z=1. With the value of z fixed, all likelihoods in the model may become unimodal, reducing risk of the algorithm becoming trapped at a local maximum. Platform 300 may compare the likelihood of the observed data plus latent variable MAP estimates under the z=0 versus z=1 models, approximating the Bayes classifier between the two cases.

Each y is independent given $\varphi$, $\xi$, and $\psi$, allowing platform 300 to evaluate the expectation of each y separately given the estimates of the remaining latent variables from the previous 5 iterations. The joint density of all factors involving y is $$p(y, x, d \mid \varphi, \xi, \psi) = p(y \mid \varphi)p(x \mid \xi_{[y]})p(d \mid \psi_{[y]})$$
$$= \varphi^y(1-\varphi)^{1-y}\xi_{[y]}^x(1-\xi_{[y]})^{1-x}DG(d \mid \psi_{[y]}).$$

The posterior density of y is then $$p(y \mid x, d, \varphi, \xi, \psi) = \frac{p(y, x, d \mid \varphi, \xi, \psi)}{\sum_{y \in \{0,1\}} p(y, x, d \mid \varphi, \xi, \psi)}.$$

Once platform 300 has calculated the posterior distribution of y, platform 300 may use that distribution to calculate the expected log-likelihood function for the factors involving each of the remaining latent variables. Each of the remaining variables may be independent given y, and their values for the next iteration may each be calculated separately.

By the standard conjugate result, the posterior density of $\varphi$ given the vector y is $$\log L(\varphi; y) \propto \left(\alpha_\varphi + \sum_{i=1}^{N} y_i - 1\right)\log\varphi + \left(\beta_\varphi + n - \sum_{i=1}^{N} y_i - 1\right)\log(1-\varphi).$$

This function is linear in y, and so by the linearity of expectation we have that $$\mathbb{E}_y[\log L(\varphi; y)] \propto \left(\alpha_\varphi + \sum_{i=1}^{N} \mathbb{E}[y_i] - 1\right)\log\varphi + \left(\beta_\varphi + n - \sum_{i=1}^{N} \mathbb{E}[y_i] - 1\right)\log(1-\varphi).$$

This expectation is also the log-likelihood of a beta-distributed random variable. This allows us to apply the standard result for the beta distribution mode as the MAP estimate for the new value or $\varphi$, yielding $$\varphi' = \underset{\varphi}{\operatorname{argmax}}\mathbb{E}_y[\log L(\varphi; y)] = \frac{\alpha_\varphi + \sum_{i=1}^{N} \mathbb{E}[y_i] - 1}{\alpha_\varphi + \beta_\varphi + N - 2}.$$

The calculation for the expected log-likelihood of $\xi$ is nearly identical, just in terms of each $\xi_y$, depending the sufficient statistic $$T_y = \sum_{i=1}^{N} 1[Y_i = y]X_i.$$

This yields that $$\xi'_y = \underset{\xi_y}{\operatorname{argmax}}\mathbb{E}_y[\log L(\xi_y; y)] = \frac{\alpha_{\xi[y]} + \sum_{i=1}^{N} \mathbb{E}(1[y_i = y]x_i) - 1}{\alpha_{\xi[y]} + \beta_{\xi[y]} + \sum_{i=1}^{N} \mathbb{E}(1[y_i = y]) - 2}.$$

The: details of the $\psi_1$ update depend on the details of the DG/DG$^{-1}$ model, but for the simple model described here it becomes a set of parallel standard categorical/multinomial updates to the conjugate Dirichlet prior followed by finding the posterior mode. Update counts may be in terms of the expected value of y. For example, for the ω ETLD component of $\psi_1$ and observed ETLDs r may yield $$k_\omega = [k_1 \ldots k_R]^T,$$

$$k_i = \sum_{j=1}^{N} \mathbb{E}[y_i]1[r_j = i].$$

This s the update rule $$\omega' = \underset{\omega}{\operatorname{argmax}}\mathbb{E}[\log L(\omega; y)] = \frac{\alpha + k_\omega - 1}{\alpha + \sum_{i=0}^{R} k_i - R}.$$

The update rules for the remaining components of $\psi_1$ proceed along the same lines.

For the final classification between z=1 and z=0 we estimate the log odds ratio between the two cases. We use the MAP estimates of the latent parameters to compute the joint log-densities of those estimates and the observed data, yielding $$\log OR_z = \log p(z,\varphi,\xi,\psi,d,x|z=1) - \log p(z,\varphi,\xi,\psi,d, x|z=0).$$

Analysis Procedure

Caraway may exploit the shared-nothing architecture of Hadoop as a distributed computing platform (e.g., platform 300 may comprise a set of distributed computers). FIG. 29 is an analysis process 2900 according to an embodiment of the invention. Execution for an analysis period may proceed in the following phases:

In 2902, platform 300 may perform novel domain filter construction. This phase may construct and store the Bloom filter of the period's E2LDs, as described in detail in the "Heuristics" section. The construction may be performed in parallel for each data partition, followed by aggregation of only the intermediate Bloom filters.

In 2904, platform 300 may perform query selection. This phase may select the sub-corpus of queries the subsequent phases may model. This selection may be performed in parallel for each data partition. This selection may effect an orders-of-magnitude reduction in the volume of queries considered.

In 2906, platform 300 may perform client-window aggregation. This phase may assemble and select the query-groups subsequent phases may model. The results of the previous phase may be sort-shuffled to efficiently and simultaneously group by client and sort by timestamp. Each client's queries may be grouped into overlapping time-ordered query-count windows. Over-small groups may be dropped, then the remainder may be hash-shuffled to distribute them evenly across executors.

$$\alpha +_{i=0} k_i - R$$

In 2908, platform 300 may perform inference. This phase may perform the actual model inference. Inference for each fixed-size query-group may be time- and memory-efficient, and the final hash-shuffle in the previous phase may distribute this work evenly across executors. Results may be filtered to retain only the y=1 queries of z=1 query-groups.

In 2910, platform 300 may perform result aggregation. This phase may aggregate results for the same client across multiple windows. The results of the inference phase may be sort-shuffled to group by client and order by the earliest query in each query group. Temporally overlapping query-groups containing overlapping y=1 queries may be merged. Inference may be re-run on these merged query-groups, further refining the results. The results of these inferences may be re-filtered as before and filtered for minimum result-size and known-benign DGAs.

In 2912, platform 300 may perform result reporting. The results may be emitted as the results of the entire analysis.

Caraway: Resource Utilization

The Caraway implementation may be horizontally scalable and may not require memory or other resources per executor-core beyond the typical cluster per-core fair share. Initial query selection may reduce the data volume by 10-100× and perform one sort- and one hash-shuffle of this reduced data. Actual inference compute and result post-processing time may be dominated by the time required for the initial filtering pass and subsequent shuffles.

Overall running time may be approximately O(n/p) where n is the number of raw input records and p is the level of task parallelism.

Caraway: Heuristics

The Caraway implementation may employ a number of heuristic measures beyond/outside of the core models in order to improve the quality of results. Theses heuristics fall roughly into three categories.

Caraway: Query Selection

The Caraway implementation may employ a number of heuristic criteria for selecting the sub-corpus of DNS queries modeled for inference. Note that, in some embodiments, the filters described below (and throughout this document) may be done in any order.

First, platform 300 may apply a number of filters internal to each query:
Ignore any queries where the queried record type was not one of A, AAAA, CNAME, DNAME, NULL, NS, PTR, or TXT.
Ignore any queries where the queried domain name: —Is within the arpa zone.
   Is not within the zone of a known public ETLD.
   Is not a valid RFC 1123 hostname up to the E2LD.
   Has an E2LD label fewer than five characters in length.
   Has an IDN label for the E2LD label. The Caraway domain generation model may need to be extended to properly handle IDNs. In embodiments using an ASCII-based model, all IDNs may look alike, regardless of actual content.

These filters may risk causing Caraway to miss some form of new malicious DGA activity, but should not interfere with detecting any existing DGAs.

Second, platform 300 may perform "novel domain" filtering. During each analysis period platform 300 may observe many domains within the zones of E2LDs which clients in the network have queried in the past. Such domains may be unlikely to have been generated by a malicious DGA, which may be employed specifically to automate frequent E2LD domain rotation. In order to efficiently identify previously-seen E2LDs, platform 300 may employ a Bloom filter. The Bloom filter is a widely-used hash-based data structure designed for probabilistic set membership testing. Bloom filters may trade decreased storage size for a user-specified probability of falsely reporting positive set membership for items which are not in fact present. Bloom filters may be time-efficient, providing O(1) insertion and lookup, and may be monadic, allowing for parallel construction of Bloom filters across both space and time. Thus platform 300 may employ the following process:

For each analysis period, assemble and store a Bloom filter of the set of observed E2LD domains.
Prior to query selection for a new analysis period, load and merge the E2LD Bloom filters for the previous n analysis periods.
During query selection, ignore any query whose E2LD might be contained in the merged Bloom filter.

The probabilistic nature of the Bloom filter may introduce some probability of falsely ignoring each previously-unseen domain name. However, most clients using malicious DGAs may be expected to query several such domains. For reasonable choices of the false positive probability (e.g., ≤0.03) the risk of falsely ignoring an impactful number of domains from a single client may be well-worth the elimination of irrelevant queries.

Third, each client's queries are not modeled in total, but platform 300 may model them in a series of independently-evaluated overlapping query-count inference windows running over the time-ordered queries. For example, for the currently-chosen window size of 20, a client which queries 40 domains may be modeled three times, in terms of the overlapping sets of the first 20, middle 20, and last 20 queries. This approach may have three benefits. First, because the core inference process is O(n2) in the number of queries, processing smaller collections of queries may decrease total running time. Second, because clients such as recursive DNS servers may query orders of magnitude more domains than the median, platform 300 may more evenly balance computation across multiple compute nodes. And lastly, it may allow the inference process to detect bursts of AGDs embedded in larger streams of noise domains, which may occur when platform 300 indirectly observes a DGA-using client via a recursive DNS server.

Finally, after aggregating queries by client and deduplicating E2LDs across a rolling span of queries, platform 300 may ignore any inference window containing fewer than four distinct E2LDs. Such small sets of distinct domains may be unlikely to be generated by a malicious DGA and unlikely to be identified as z=1 by the inference process even if they are.

Caraway: Result Selection

Platform 300 may apply two heuristic filters to the selection of results. Note that, in some embodiments, the filters described below (and throughout this document) may be done in any order.

First, platform 300 may ignore any results containing fewer than four queries where y=1. Such a small number of domains may be less likely to be generated by a malicious DGA than by random chance or by Google Chrome, which generates domains in batches of three.

Second, platform 300 may explicitly attempt to filter out results produced by known benign DGAs, which may include only Google Chrome but could include others in the future. Platform 300 may identify results where at least some heuristically-chosen proportion of the domain could have been produced by the benign DGA (currently 70%). Then platform 300 may perform a frequentist hypothesis test of the null hypothesis that the test DGA generated the potentially-matching domains versus the alternative hypothesis that it did not. Platform 300 may perform this test by a Bonferroni-corrected series of $\chi^2$ goodness-of-fit tests for the distributions of E2LD label lengths and character frequencies against those produced by the test DGA, for example. Platform 300 may ignore any results where the tests fail to achieve some chosen significance level (e.g., $\alpha$=0.001).

TailJumps

One of the aims of CALI may be to identify suspicious behavior within networks. This may be done by modeling typical network behavior and searching for patterns that deviate from the norm. From a mathematical perspective, this approach falls in the domain of statistical outlier detection. In fact, outlier detection may be a common component of statistical modeling. One reason that this procedure may be so ubiquitous is that so-called "outliers" can disrupt even the best models. A considerable amount of theory has been developed for the area of outlier detection. However, much of the field focuses on specific types of data with an assortment of rigid assumptions. Platform 300 may be able to detect outliers within continuously changing data sets across a range of analytics. A broad task like this may be served by a very general approach to outlier detection that can be applied to a wide range of data sets.

Figure 16:
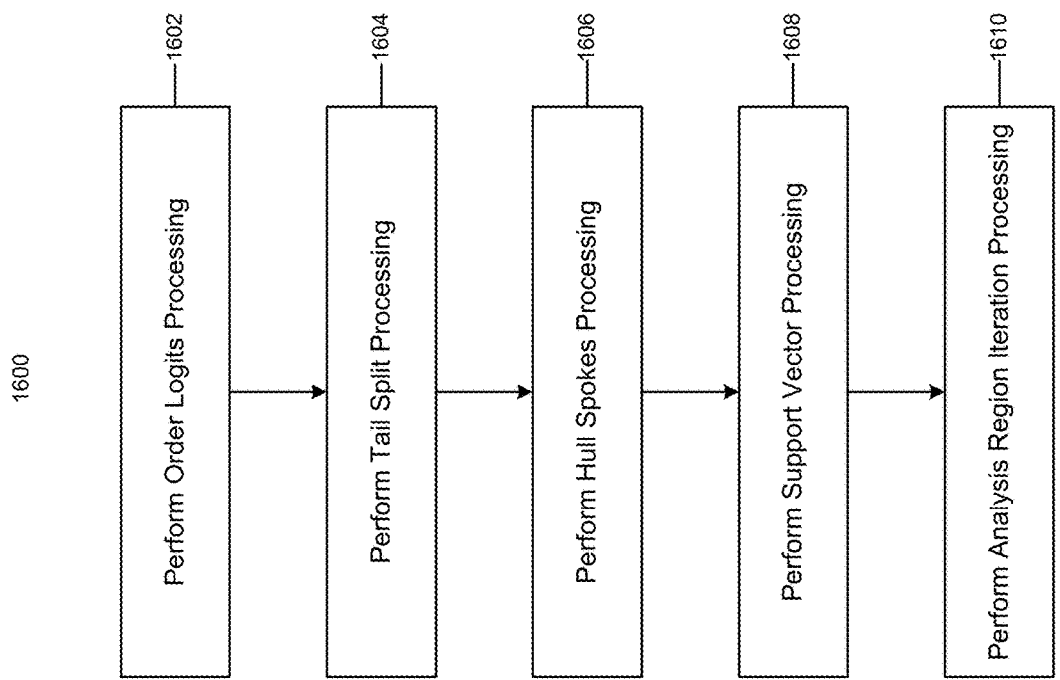
FIG. 16 is a TailJumps process according to an embodiment of the invention.

FIG. 16 is a TailJumps process 1600 according to an embodiment of the invention. Platform 300, as executed by the at least one platform server 100, may perform TailJumps process 1600 to analyze outliers. TailJumps may provide nonparametric outlier detection analytics (ODA) by a straightforward approach with a distinct Machine Learning feel. TailJumps may have broad adaptability to general underlying distributions.

Figure 17:
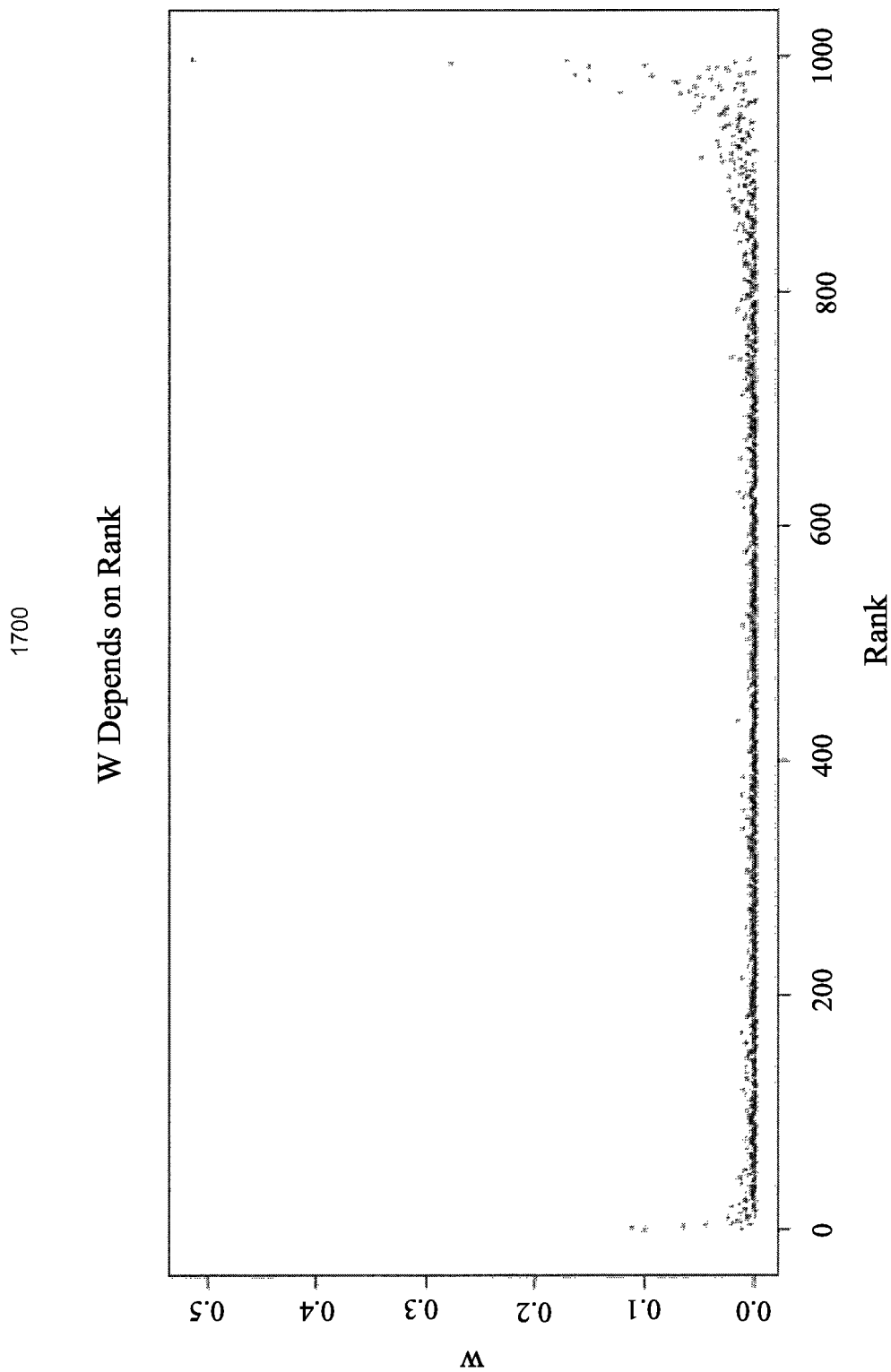
FIG. 17 is an example vector of interest graph according to an embodiment of the invention.

In 1602, platform 300 may perform Order Logits processing. Platform 300 may take as input a two-dimensional data set with n approximately independent observations. The first column of the data may be a vector of distinct IDs and the second column may be a vector including positive numerical values (if platform 300 does not have positive values, platform 300 may take the absolute value). Platform 300 may use the assumption that larger values have a higher chance of being true positives. Let Z denote the vector of interest (residuals, reconstruction errors, or any other analytic output). Platform 300 may rearrange Z through a first transformation by letting $V=[Z_{(n)}, Z_{(n-1)}, \ldots, Z_{(1)}]$, which are the order statistics of Z. Platform 300 may transform V to get a vector of interest, $W=[\log(V_n/V_{n-1}), \log(V_{n-1}/V_{n-2}), \ldots, V_2/V_1]$, an (n−1)-dimensional vector. The two transformations which produce W may be simple, yet powerful in their ability to rid the data of common distributional effects which can complicate outlier detection. FIG. 17 is an example vector of interest W graph 1700. FIG. 17 provides a view of transformed outlier scores using TailJumps. The y-axis shows W, which is the log-transformed quotient of the order statistics, and the x-axis is the rank of that entity.

In 1604, platform 300 may perform Tail Split processing. General-purpose outlier detection may require a keen focus on the tail of the underlying data. Only the most extreme values of a data set may be in consideration to be labeled outliers. Thus, most of the data may be able to be effectively be disregarded as it has little or no bearing on the outlier labeling. In 1604, platform 300 may pare down the data to only the relevant values. Platform 300 may accomplish this by splitting the data into three distinct regions of transformed vector, W.

Figure 18:
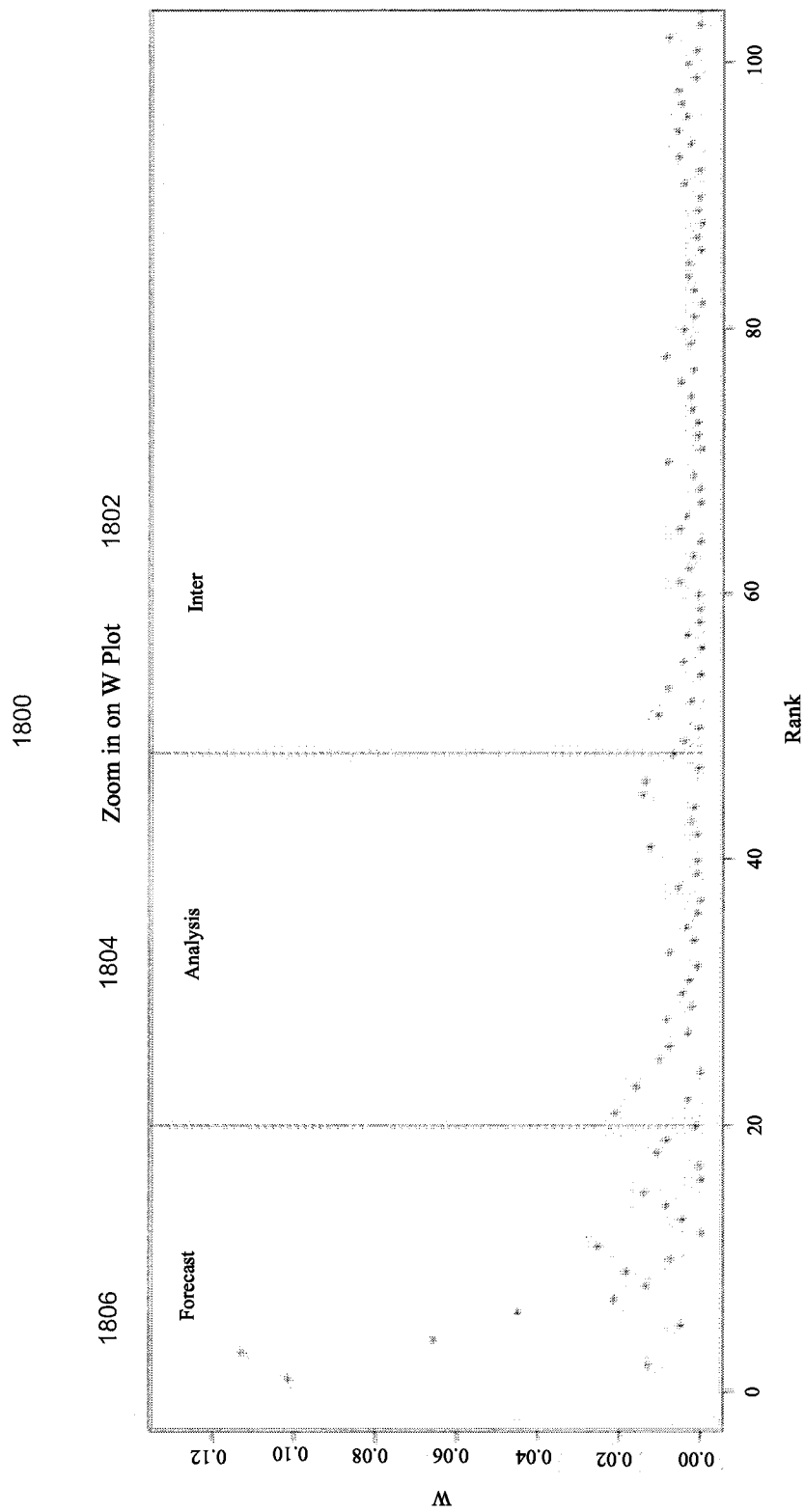
FIG. 18 is an example vector of interest graph including regions according to an embodiment of the invention.

The first region is referred to as the Clear Inlier Region. It may contain all of the smallest values of the data which contain no points which may potentially be labeled as outliers or any points which would be helpful in predicting them. The second region may be referred to as the Analysis Region. This region may be defined by a range of large values but none of the most extreme values which are most likely to be Positives. A purpose of the Analysis Region, as the name suggests, may be to analyze and identify the shape of the tail of the data. Once the tail is identified in this region, the ODA may be able to gain a sense of which values should be labeled outliers in the final region. This final region may be called the Forecast Region and may be seen as an extension of the data's tail into its most extreme values. Predictions about the shape of this region are made within the Analysis Region and deviations from these predictions lead to the assignment of outlier labels. FIG. 18 is an example graph 1800 showing these regions (inlier 1802, analysis 1804, and forecast 1806) for the vector of interest W. FIG. 18 shows W broken up into the three distinct regions: Inliers, Analysis, and Forecast. For illustration, FIG. 18 is zoomed in towards the original to show the Forecast and Analysis regions in more detail.

In order to split the data into the three regions of interest, platform 300 may define two cut-off points, $[C_1, C_2]$, within W. $C_1$ and $C_2$ denote the lower- and upper-bound of the Analysis Region, respectively. Both of these points may have simple interpretations. Consider that values of W ranging from $C_2$ to n may correspond to the smallest values of the original vector, Z. These may be the points which would never warrant outlier assignment. Values ranging from $C_1$ to $C_2$ may be moderately large and may generally fall in the tail of the underlying distribution. They may not be large enough to be labeled outliers but may help predict the ones that should. The largest values of the data may correspond to points on W between 1 and $C_1$. These may be the points which are in consideration to be labeled as outliers.

Figure 19:
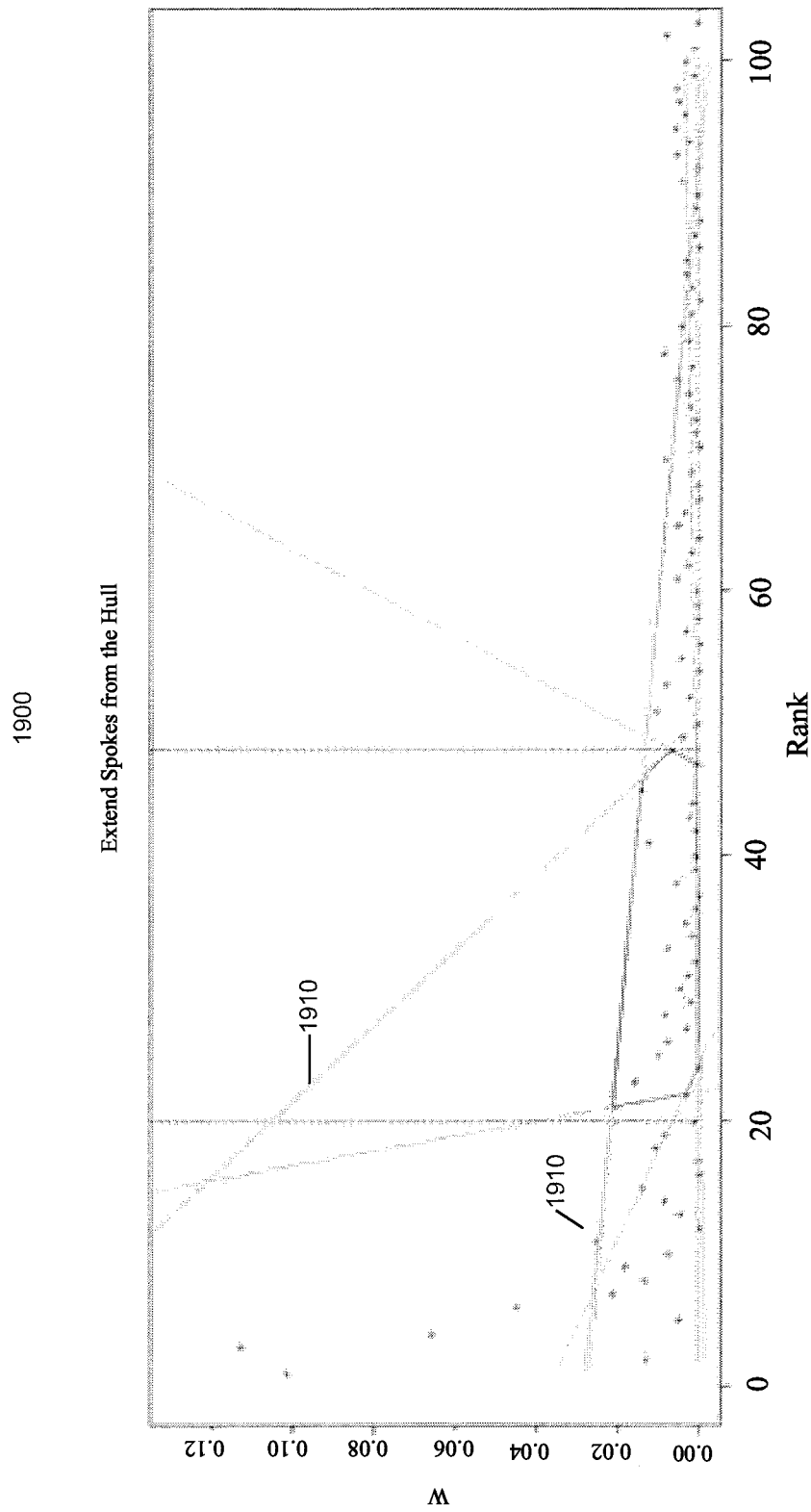
FIG. 19 is an example vector of interest graph including hull spokes according to an embodiment of the invention.

In 1606, platform 300 may perform Hull Spokes processing. FIG. 19 is an example graph 1900 including hull spokes for the vector of interest W. Once the two cut-off points of the Analysis Region have been defined, platform 300 may draw a convex hull encircling the points in this region. The definition of W may ensure that each of the n−1 points of the vector lie in the interval [0, ∞). Thus, drawing a convex hull around the $C_2$–$C_1$ points in the Analysis region may result in a polygon with a flat bottom and a top that decreases along the x-axis. This will occur because the tails of most distributions are monotonically decreasing. After the convex hull is drawn around the border points in the Analysis Region, platform 300 may extend each of the line segments of the polygon outward as illustrated in graph 1900.

After extending the "spokes" from each of the line segments, platform 300 may keep only the spokes on the top of the hull. In the example graph 1900, the retained spokes 1910 may include the three spokes on the top of the polygon that point in the direction of the y-axis.

Figure 20:
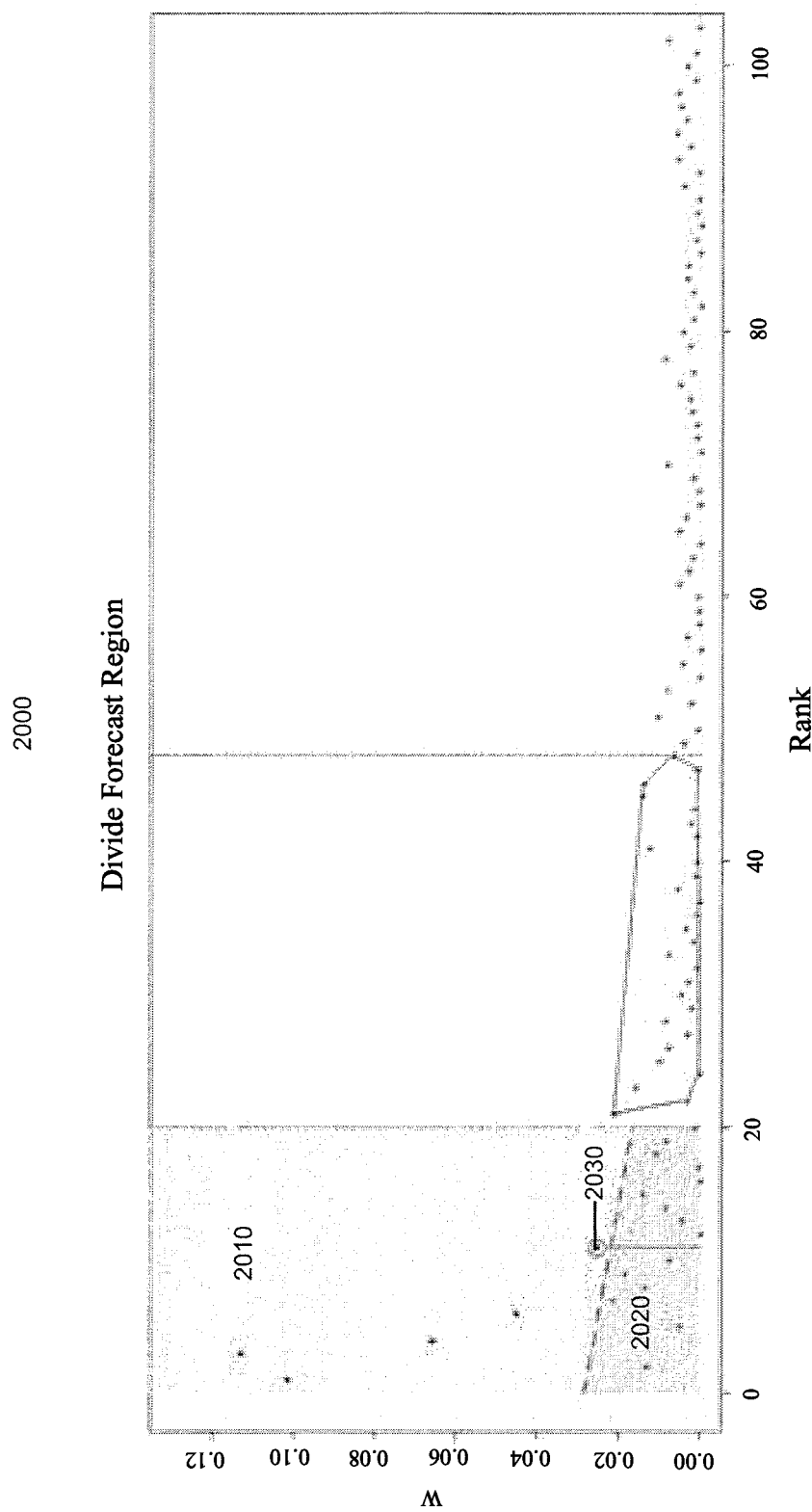
FIG. 20 is an example vector of interest graph including a divided forecast region according to an embodiment of the invention.

In 1608, platform 300 may perform Support Vector processing. FIG. 20 is an example graph 2000 including a divided forecast region for the vector of interest W. The top spokes 1910 outlined in the Analysis Region may form the basis for the support vector in this processing. Each of the spokes 1910 identified may give a crude indication of the expected shape of the Forecast Region. It is not expected that each of the spokes 1910 will provide an accurate model. Rather, a weighted average of these spokes 1910 may provide a useful prediction of the Forecast Region's shape. This weighted average of the top spokes 1910 may divide the Forecast region into two additional distinct regions—one on top 2010 and one on bottom 2020. The largest indexed point 2030 in the top region 2010 may provide a cursory indication of where to begin flagging outliers.

In this example, the $11^{th}$ point of the W vector lies above the projected line in the Forecast Region. In other words, based on the values observed in the Analysis Region, we would expect the majority of the points in the Forecast Region to lie below the dashed green line. Since the $11^{th}$ point of W lies above this boundary, this provides a cursory indication that the top 11 points of the original data set are outliers.

In 1610, platform 300 may perform Analysis Region Iteration processing. The forecast projection lines obtained in 1608 may be subject to a fair amount of variation. They may depend on the exact cut-off points that were initially chosen. To circumvent this undesirable data-dependence, platform 300 may use Analysis Region Iteration processing to choose multiple sequences of cut-off points and iterate through them. The exact mechanics of this process may include specifying a function defining the desired cut-off points and the number of cycles to iterate through. With each cycle, a cursory outlier cut-off point may be produced. These cut-off points may exhibit some variation. Since each cycle may be likely to produce a liberal estimate of the cut-off, platform 300 may adjust for this bias by using the cycle that produces the smallest cut-off point. For instance, suppose platform 300 cycles through ten iterations of varying Analysis Regions. If the cycle that produces the smallest outlier cut-off indicates there are five outliers, then only the five most extreme values in the original data set may be labeled outliers.

TailJumps leverages a very general principle of statistics in that most probably distributions have smoothly decreasing tail regions. Distributions that do not have this property may not work with TailJumps, but in cybersecurity applications those distributions may mostly correspond to values that have a clear interpretation (e.g., entropy) for which a cutoff is readily available. Therefore, TailJumps may be applicable and sufficient for a wide variety of univariate outlier detection problems. TailJumps may choose outliers based on large jumps in order statistics rather than large deviations from a mean a la IQR-based methods. The ODA has been shown to maintain high sensitivity and low false positive rates for a wide range of synthetic data.

Janus

A problem ubiquitous among cyber security platforms is that the Threat Discovery tool (e.g., the unsupervised core) produces a large number of alerts, with an average of a 50% false positive rate, although that false positive rate can be much larger. Threat Discovery tools may be meant to find needles in the haystack, but instead end up creating just a smaller haystack. With such a large number of alerts to wade through, Security Operations Center (SOC) analysts may be increasingly unable to find important threats, and even if they are there may be no context given to the threats that they find. To address these issues, platform 300 may include an AI system called Janus that automates this task of wading through alerts by replicating an SOC analyst's mind.

Figure 21:
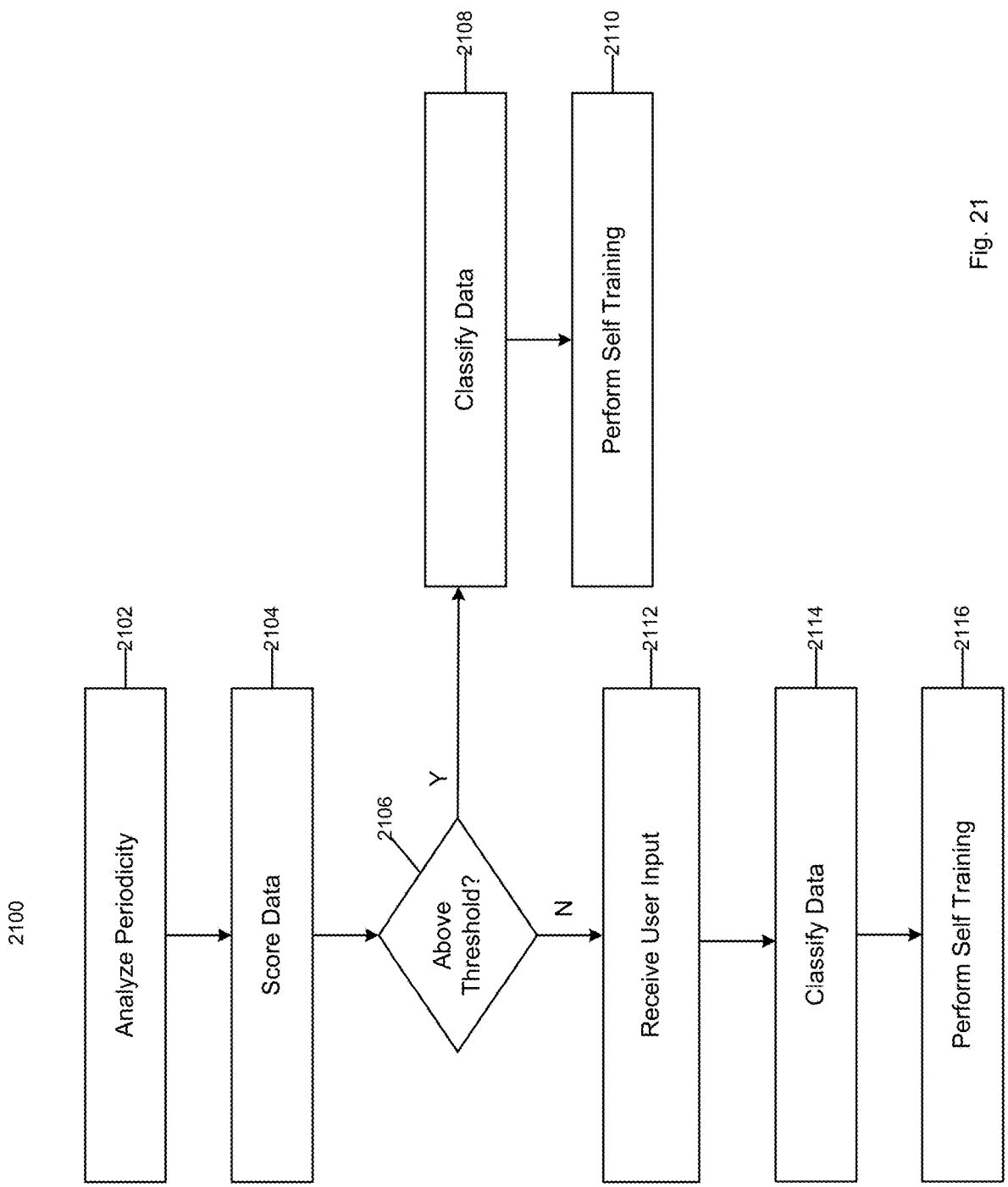
FIG. 21 is a Janus process according to an embodiment of the invention.

FIG. 21 is a Janus process 2100 according to an embodiment of the invention. Platform 300, as executed by the at least one platform server 100, may perform Janus process 2100 and thereby employ various machine learning techniques that allow platform 300 to systematically, quickly, efficiently, and accurately both determine if an alert is potentially malicious and provide context to what type(s) of malicious activity that alert may correspond to. The following section outlines and explains example training data, feature extraction, supervised learning classifier, the active learning system, the self-training system, and the context-providing categorization engine that may comprise Janus.

As an SOC analyst looks at the raw data for an entity (i.e. logs, flows, DNS records), they may implicitly form opinions about the type of behaviors they see while trying to connect it to past knowledge they have of threats. They may look at how these behaviors interact with each other to make complex judgments. Netflow data, for example, may contain information about the IPs connecting to each other, the ports connected, the internet protocols used, and the number of bytes and packets sent. From that data, the analyst may be able to subconsciously generate metadata to describe what they see from a particular IP, and that may allow them to determine whether that IP is potentially engaging in malicious activity. Thus, Janus may also generate metadata from the raw data it is given to begin making associations.

The metadata that Janus may use for Netflow data is given in Table 1 2200 of FIGS. 22A-22B as an example of the type of feature generation that Janus uses. Table 1 2200 is a list of features Janus may use for Netflow data. Each feature may be populated for each outlier IP. Destination IPs may be IPs contacted by the outlier, and Source IPs may be IPs contacting the outlier. These example values can be determined by working closely with SOC analysts to ascertain what aspects of an IPs behavior helps the analyst make a determination. Thus, these features may quantify the same type of behavior that an SOC analyst implicitly uses. For different types of data, Janus may use different features, just as an SOC analyst looks for different things in different types of logs.

In 2102, platform 300 may analyze periodicity of data. In cyber finding, a periodic behavior may be indicative machine-like behavior, and thus several features of Janus may incorporate periodicity. Of course, simply because behavior is machine-like may not mean that it is nefarious (e.g., a scheduled backup is not nefarious, but will happen in a periodic fashion), which is one reason it is only one of many features Janus may take into account. For example, platform 300 may collect data from ports listed in Table 2 2300 of FIG. 23 and analyze the data for periodicity. Table 2 2300 is a list of ports that may be used in Janus's features and categorization. The port and description are given, and an X is placed under column Critical, IE, EI, or BitTorrent to indicate the port's association with these respective behaviors.

Malware might also not have perfectly periodic behavior. For example, a hacker might make their malware slightly imperfectly periodic to avoid detection. Thus, platform 300 may use an analytic that can find periodic, or slightly periodic, behavior. This analytic may look at the entropy of the interarrival times of events and convert them to a score $s \in [0, 1]$.

For example, platform 300 may try to find the periodicity of connection times $t_1, t_2, \ldots, t_m$ between and outlier and another IP. Platform 300 may find the interarrival times $\delta_1 = t_2 - t_1, \delta_2 = t_3 - t_2, \ldots, \delta_{m-1} = t_m - t_{m-1}$ and find the normalized Shannon entropy of those interarrival times $$E = -\sum_{i=1}^{m-1} \frac{p(x_i) \ln(p(x_i))}{\ln(m-1)}.$$

$E \in [0, 1]$, and since entropy can be thought of as a measure of the amount of randomness in a distribution, the closer E is to 1 the more random the interarrival times may be. The closer E is to 0, the less random the interarrival times may be, and thus the more periodic the behavior. This measure of periodicity is superior to measures using Fourier analysis or a similar approach since this can also find periodic-like behavior, not just fully periodic behavior.

In 2104, platform 300 may score periodicity of data. Janus may use a score $s=1-E$, so that a larger s corresponds to more periodic. For validity, set $s=0$ if $m \leq 2$. In 2106, platform 300 may determine whether the score is above a confidence threshold. If so, in 2108, platform 300 may classify the data and, in 2110, perform self-training, which is discussed in greater detail below. If not, in 2112, platform 300 may receive user input regarding the classification of the data. In 2114, platform 300 may classify the data according to the user input and, in 2116, perform self-training.

Platform 300 may perform self-training to improve classification and require less user intervention moving forward. Just as an SOC analyst has a knowledge base of past threats that he or she relies on, so must Janus. This may come in the form of training data, which are behaviors that SOC analysts have already looked at and determined whether or not those behaviors are potentially nefarious. The training data for Janus may represent a diverse range of user behavior, allowing Janus to cover a wide threat space as well as a large amount of good behavior so that it can tell the difference between the two. To train Janus, the behaviors within the training data may be transformed into the features Janus recognizes. Those behaviors may have a label that has been generated by an SOC analyst. For example, labels may include "Forward," "Do Not Send," and "Unknown," which are described in Table 3 2400 of FIG. 24. Table 3 2400 shows possible recommendations/classes that Janus may output and a description for each. From this, Janus can then take new data, generate metadata from it, relate it to its knowledge base and then make a decision on whether that data should be classified as Forward, Do Not Send, or Unknown. Table 4 2500 of FIG. 25 provides a sample of outputs from Janus across multiple days according to an embodiment of the invention. Outputs may include classes and categories.

An observation from Table 1 2200, which can be gleaned from all of the feature sets of Janus, is that the values are normalized to allow Janus to work with different customers and different time slices. This may allow Janus to be truly generalizable across customers, industries, and timespans. This may be a distinction from training sets used in other cybersecurity classifiers. Those are often IP based, not behavior based, but since an IP can change its behavior over time that could easily lead to misclassification. Also, many training sets use Threat Intel feeds, which have found to be quite problematic. For example, Verizon found a less than 3% overlap in 56 Threat Intel feeds in 2015, indicating low confidence in the findings of any one. Also, many Threat Intel feeds focus on domain names and IP addresses which can change rapidly, which is likely why only 1% of IPs on Threat Intel feeds may have lasted a full seven days. As Threat Intel feeds are the only obvious other source of training data, the approach to training described herein may be superior.

Figure 26:
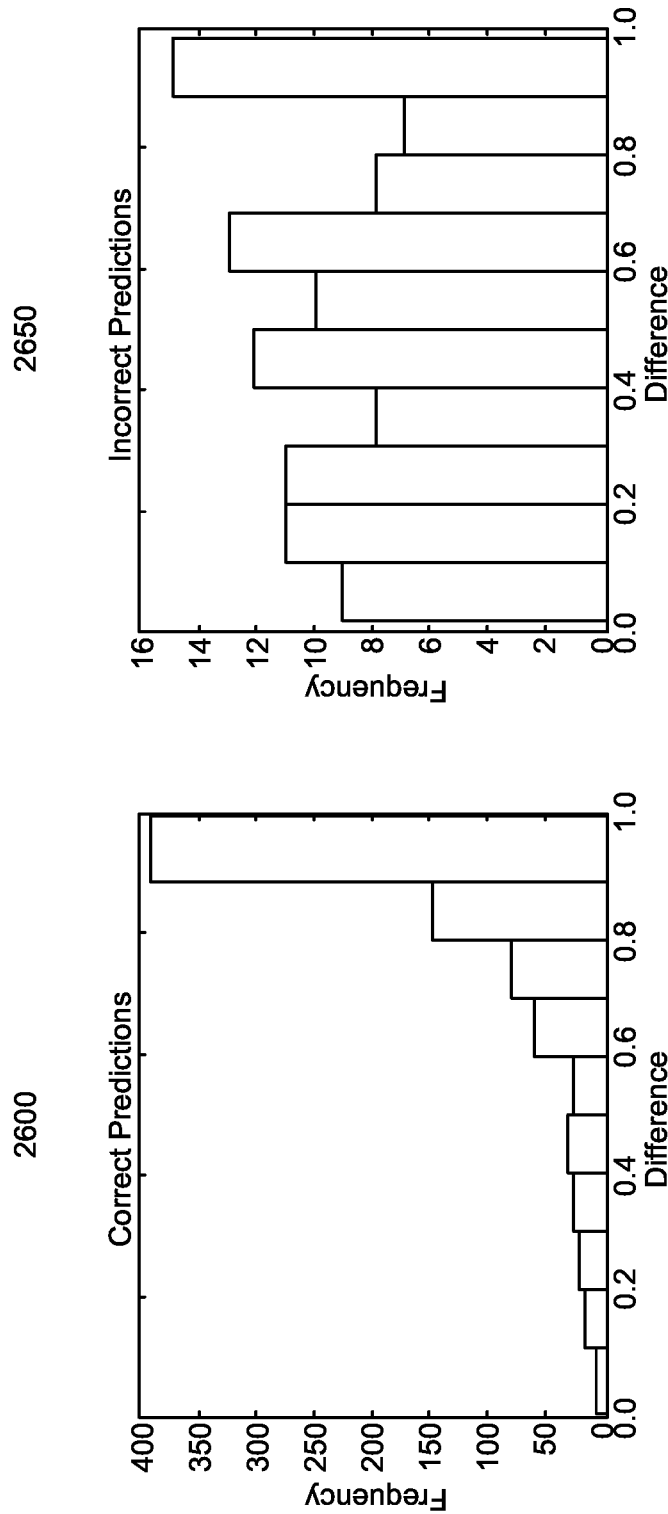
FIG. 26 is an example prediction result according to an embodiment of the invention.

Janus may use a random forest classifier as its machine learning algorithm. The classifier may produce a probability for each class which may be used for active learning and self-training. Potential Janus output 2600, 2650 is shown in the example of FIG. 26. Output may include correct predictions 2600 and incorrect predictions 2650. Each of correct predictions 2600 and incorrect predictions 2650 in FIG. 26 is represented as a histogram of $p_1$-$p_2$ for Janus LOO cross-validation. Thus, just as an SOC analyst makes associations from the behavior it sees to things it has seen earlier, Janus uses the previous knowledge (training data) to classify behaviors (features) it sees now.

Unlike most classifiers used in the space, Janus may include a class for "Unknown." This may be the first place where Janus handles uncertainty, where the second is described below. In practice examples, the training data contains about 6.25% data points that are "Unknown," and also in practice they are not often seen.

The "Unknown" class may include data points that Janus flags as difficult for an SME to label. Janus can also output decisions with which it is uncertain. It may do this by looking at the difference between the probability of the most probable class and the second most probable. Let $p_F$, $p_U$, and $p_D$ be the probabilities that a host is in the "Forward," "Unknown," or "Do Not Send" classes, respectively, and let $p_1$, $p_2$, and $p_3$ be the probabilities for the most probable, second most probable, and least probable classes. Janus may determine that it is uncertain about a decision (that that decision is on the decision boundary of the classifier, and thus should be tagged "Decision Boundary"), if $$p_1 - p_2 \leq 0.2.$$

This cutoff was chosen by looking at the distribution of decisions that Janus got correct and incorrect through leave-one-out (LOO) cross-validation, where it was seen that in the space of data where $p_1-p_2<=2$, Janus was able to determine the Forward 57.9% of the time accurately and the Do Not Send class 76% of the time (note that when $p_1-p_2>0.2$, Janus is correct 96% of the time). The distribution of data where Janus correctly 2600 and incorrectly 2650 made a decision through LOO cross-validation are shown in FIG. 26. As $p_1-p_2$ increases, Janus becomes exponentially more correct in its decisions. Said differently, as Janus becomes more confident in its decision, it may be more likely to be correct.

This labeling of data as "Decision Boundary" may be a form of active learning, since those data points may be sent to an SOC analyst to label and add to the training set. With Janus, this may happen approximately 5.3% of the time, which means that an SOC analyst may only need to investigate an even smaller percentage of alerts since he or she may be incredibly confident in decisions made by Janus.

Labeling data as "Decision Boundary" in this way may ensure that unknown threats brought up by the unsupervised core are not incorrectly treated as Janus confidently labeling them. This may have particular significance in a cyber security landscape since the cyber security landscape is constantly changing. Without this active learning component, new threats may arbitrarily be assigned a Forward or Do Not Send, while with the active learning component, Janus can indicate that these automatically need special attention. This may allow new training data of Janus to be focused solely on decisions that Janus is uncertain about while also focusing SOC efforts only on things Janus needs help with.

This form of active learning may include a combination of uncertainty sampling and query by committee used to work specifically with Janus. Uncertainty sampling picks the points that the classifier is most uncertain about, where uncertainty can be measured with entropy, low confidence, $p_1-p_2$, or another way. In query by committee, a committee of classifiers are built, and the points where the committee disagrees most are chosen for labeling. Janus uses a random forest, which by default creates a committee of decision tree classifiers, and thus platform 300 uses query by committee through uncertainty sampling.

As Janus becomes more confident in its predictions, it may be also more likely right. For $p_1 \geq 0.9$ we see that Janus is correct 96.5% of the time (98.7% when not including Unknown), which is incredibly accurate. Because of this, data that Janus labels with $p_1 \geq 0.9$ may be taken as ground truth and added to Janus' training set (e.g., in 2106-2108). This technique is known as self-training, and in many applications has been shown to over time increase the overall accuracy of the classifier. By adding ground truth to the training set, on successive iterations Janus may have more base knowledge with which to make associations, thus allowing it to be more accurate. In cybersecurity, there is an alternate desire as well. Cyber threats change constantly, and Janus's training set may evolve with evolving threats at a faster rate than simply active learning can allow. Having a self-training aspect as well as an active learning aspect to the system may allow Janus to evolve with the evolving threat space while having minimal SOC involvement.

To truly speed up and take over SOC operations, not only do customers possibly need to know that an alert corresponds to potentially malicious behavior, but they also may need to have an idea of what type of malicious behavior that alert corresponds to. This can focus the customer's efforts and allow them to take appropriate action faster. The system may now give context by providing one of 22 categories. Janus may also take these categories in as inputs, except for the Shodan and Blacklist categories. These categories were created through close work with SOC analysts, and make it so that they can quickly identify outlier behavior. Only about 9% of outliers that are Uncategorized are Forwards, and thus the categories seem to describe well the space of interesting behavior.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method of analyzing cybersecurity threats comprising:
    performing processing associated with receiving, with an analysis module of a processor, log data from a network node;
    performing processing associated with identifying, with the analysis module, a statistical outlier within the log data using Tailjumps, the identifying comprising:
        transforming the log data into community data indicative of a network structure, identifying a plurality of communications between nodes in the community data, and identifying the statistical outlier within the plurality of communications;
        generating a behavioral graph model using the log data, determining a best fit line for a characteristic of the behavioral graph model, and identifying a data point at or beyond a predetermined distance from the best fit line as the statistical outlier; or
        analyzing text data in the log data using language processing algorithm to identify the statistical outlier; or
        a combination thereof; and
    performing processing associated with determining, with the analysis module, that the statistical outlier represents a cybersecurity threat by applying a Janus machine learning algorithm to provide a predication about the novelty of the statistical outlier,
    wherein the Janus machine learning algorithm categorizes the statistical outlier into classes, wherein the classes are separated by a security threat decision boundary, and wherein the classes comprise: a forward class that is a most probable security threat class, a do not send class that is a least probable security threat class, and an unknown class for entities that are on the security threat decision boundary;

performing processing associated with forwarding statistical outliers categorized as unknown for additional analysis;

performing processing associated with updating the security threat decision boundary based on analysist input; and performing processing associated with repeating the categorizing for the statistical outliers categorized as unknown with an updated security threat decision boundary.

2. The method of claim 1, wherein the processing associated with transforming the log data into community data comprises determining connections between network nodes from the log data.

3. The method of claim 1, wherein the processing associated with analyzing the text data comprises generating a feature, modeling the feature using an autoencoder to learn the underlying structure, and finding a deviation from the underlying structure.

4. The method of claim 3, wherein the feature is generated using Word2Vec.

5. The method of claim 3, wherein the modeling is performed using a neural network.

6. The method of claim 1, wherein the processing associated with identifying the statistical outlier comprises filtering the community data, the behavioral graph model, or the text data, or a combination thereof to ignore all but extreme values within the community data, the behavioral graph model, or the text data, or the combination thereof.

7. The method of claim 1, wherein the processing associated with identifying the statistical outlier comprises filtering the community data, the behavioral graph model, or the text data, or a combination thereof to select data within the community data, the behavioral graph model, or the text data, or the combination thereof that lies within a determined region of interest.

8. The method of claim 7, wherein the determined region of interest comprises a region outside a clear inlier region.

9. The method of claim 7, wherein the determined region of interest comprises a forecast region.

10. The method of claim 7, further comprising performing processing associated with analyzing, with the analysis module, the community data, the behavioral graph model, or the text data, or the combination thereof to determine the determined region of interest.

11. The method of claim 1, wherein the processing associated with determining that the statistical outlier represents a cybersecurity threat comprises determining whether the statistical outlier has a feature from a suspicious feature set.

12. The method of claim 11, wherein the suspicious feature set is generated by training a machine learning algorithm.

13. The method of claim 12, further comprising performing processing associated with training, with the analysis module, the machine learning algorithm.

14. The method of claim 13, wherein the training comprises applying past ground-truth results generated by the analysis module to the suspicious feature set.

15. The method of claim 13, wherein the training comprises receiving a user input.

16. The method of claim 1, wherein the processing associated with determining that the statistical outlier represents a cybersecurity threat comprises determining that the statistical outlier is a periodic behavior.

17. The method of claim 1, wherein the machine learning algorithm comprises a random forest algorithm for self-training.

18. The method of claim 17, wherein the random forest includes an unknown class for active learning.

19. The method of claim 1, further comprising performing processing associated with analyzing a domain generation algorithm (DGA) using a generic probabilistic model.

20. The method of claim 19, wherein the processing associated with analyzing the DGA comprises aggregating requests generated by the DGA, discarding domains requested by the DGA, or analyzing similarity of requests generated by the DGA, or a combination thereof.

21. The method of claim 1, further comprising performing processing associated with analyzing a user-generated request by applying a user agent anomaly detection algorithm.

22. The method of claim 21, further comprising performing processing associated with training the user agent machine learning algorithm.

23. A system for analyzing cybersecurity threats comprising:

a processor;

a network interface in communication with the processor; and an analysis module of the processor configured to:

perform processing associated with receiving log data from network node by the network interface;

perform processing associated with identifying statistical outlier using Tailjumps within the log data, the identifying comprising:

transforming the log data into community data indicative of a network structure, identifying a plurality of communications between nodes in the community data, and identifying the statistical outlier within the plurality of communications;

generating a behavioral graph model using the log data, determining a best fit line for characteristic of the behavioral graph model, and identifying data point at or beyond a predetermined distance from the best fit line as the statistical outlier; or analyzing text data in the log data using language processing algorithm to identify the statistical outlier; or a combination thereof; and perform processing associated with determining that the statistical outlier represents a cybersecurity threat by applying a Janus machine learning algorithm to provide a predication about the novelty of the statistical outlier, wherein the Janus machine learning algorithm categorizes the statistical outlier into classes, wherein the classes are separated by a security threat decision boundary, and wherein the classes comprise: a forward class that is a most probable security threat class, a do not send class that is a least probable security threat class, and an unknown class for entities that are on the security threat decision boundary;

performing processing associated with forwarding statistical outliers categorized as unknown for additional analysis;

performing processing associated with updating the security threat decision boundary based on analysist input; and performing processing associated with repeating the categorizing for the statistical outliers categorized as unknown with an updated security threat decision boundary.

24. The system of claim 23, wherein the processing associated with transforming the log data into community data comprises determining connections between network nodes from the log data.

25. The system of claim 23, wherein the processing associated with analyzing the text data comprises generating a feature, modeling the feature using an autoencoder to learn the underlying structure, and finding a deviation from the underlying structure.

26. The system of claim 25, wherein the feature is generated using Word2Vec.

27. The system of claim 25, wherein the modeling is performed using a neural network.

28. The system of claim 23, wherein the processing associated with identifying the statistical outlier comprises filtering the community data, the behavioral graph model, or the text data, or a combination thereof to ignore all but extreme values within the community data, the behavioral graph model, or the text data, or the combination thereof.

29. The system of claim 23, wherein the processing associated with identifying the statistical outlier comprises filtering the community data, the behavioral graph model, or the text data, or a combination thereof to select data within the community data, the behavioral graph model, or the text data, or the combination thereof that lies within determined region of interest.

30. The system of claim 29, wherein the determined region of interest comprises a region outside a clear inlier region.

31. The system of claim 29, wherein the determined region of interest comprises a forecast region.

32. The system of claim 29, wherein the analysis module is further configured to perform processing associated with analyzing the community data, the behavioral graph model, or the text data, or the combination thereof to determine the determined region of interest.

33. The system of claim 23, wherein the processing associated with determining that the statistical outlier represents a cybersecurity threat comprises determining whether the statistical outlier has a feature from a suspicious feature set.

34. The system of claim 33, wherein the suspicious feature set is generated by training the machine learning algorithm.

35. The system of claim 34, wherein the analysis module is further configured to perform processing associated with training the machine learning algorithm.

36. The system of claim 35, wherein the training comprises applying past ground-truth results generated by the analysis module to the suspicious feature set.

37. The system of claim 35, wherein the training comprises receiving a user input.

38. The system of claim 23, wherein the processing associated with determining that the statistical outlier represents a cybersecurity threat comprises determining that the statistical outlier is a periodic behavior.

39. The system of claim 23, wherein the machine learning algorithm comprises a random forest algorithm for self-training.

40. The system of claim 39, wherein the random forest includes an unknown class for active learning.

41. The system of claim 23, wherein the analysis module is further configured to perform processing associated with analyzing a domain generation algorithm (DGA) using a generic probabilistic model.

42. The system of claim 41, wherein the processing associated with analyzing the at least fone DGA comprises aggregating requests generated by the DGA, discarding domains requested by the DGA, or analyzing similarity of requests generated by the DGA, or a combination thereof.

43. The system of claim 23, wherein the analysis module is further configured to perform processing associated with analyzing a user-generated request by applying a user agent machine learning algorithm.

44. The system of claim 43, further comprising performing processing associated with training the user agent machine learning algorithm.

* * * * *